US012578723B2

(12) United States Patent
Ando et al.

(10) Patent No.: US 12,578,723 B2
(45) Date of Patent: Mar. 17, 2026

(54) VEHICLE

(71) Applicant: TOYOTA JIDOSHA KABUSHIKI KAISHA, Toyota (JP)

(72) Inventors: Eisuke Ando, Nagoya (JP); Takehito Fujii, Anjyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 230 days.

(21) Appl. No.: 18/466,504

(22) Filed: Sep. 13, 2023

(65) Prior Publication Data

US 2024/0152141 A1 May 9, 2024

(30) Foreign Application Priority Data

Sep. 30, 2022 (JP) ................................. 2022-158507

(51) Int. Cl.
*G05D 1/00* (2024.01)
(52) U.S. Cl.
CPC .................................. *G05D 1/0077* (2013.01)
(58) Field of Classification Search
CPC .... G05D 1/0077; B60W 10/30; B60W 50/08;
B60W 60/00; B60W 50/00; B60W
2050/0002
See application file for complete search history.

(56) References Cited

U.S. PATENT DOCUMENTS

| | | | | |
|---|---|---|---|---|
| 7,068,153 | B2 * | 6/2006 | Flick | F02N 11/0807 |
| | | | | 340/426.36 |
| 8,412,449 | B2 * | 4/2013 | Trepagnier | G05D 1/0248 |
| | | | | 701/28 |
| 9,488,979 | B1 * | 11/2016 | Chambers | G05D 1/1064 |
| 9,580,080 | B1 * | 2/2017 | Letwin | B60W 50/082 |
| 11,036,233 | B2 * | 6/2021 | Costa | G05D 1/65 |
| 11,673,574 | B2 * | 6/2023 | Suzuki | B60W 60/0025 |
| | | | | 701/23 |
| 11,891,055 | B2 * | 2/2024 | Suzuki | B60W 30/181 |
| 12,128,922 | B2 * | 10/2024 | Winter | B60W 60/0011 |
| 2021/0237765 | A1 * | 8/2021 | Ando | B60R 16/04 |
| 2022/0242415 | A1 * | 8/2022 | Nice | B60W 40/04 |
| 2023/0119228 | A1 * | 4/2023 | Ando | B60W 60/00 |
| | | | | 701/23 |
| 2023/0192129 | A1 * | 6/2023 | Winter | G05D 1/2249 |
| | | | | 701/24 |

FOREIGN PATENT DOCUMENTS

JP 2018-132015 A 8/2018

* cited by examiner

*Primary Examiner* — Masud Ahmed
(74) *Attorney, Agent, or Firm* — Oliff PLC

(57) ABSTRACT

An ADK determines whether or not a subject device has stopped operation due to control interference caused by a user operation and an ADK operation that were simultaneously performed. When the ADK determines that the subject device has stopped operation due to control interference caused by the user operation and the ADK operation that were simultaneously performed, the ADK transmits to a VP (VCIB), a control request (an operation command) indicating "no request (No request)" corresponding to the subject device that has stopped operation.

13 Claims, 18 Drawing Sheets

FIG.5

2nd_Left_Door_Operate_Command

| Value | Description | Remarks |
|-------|-------------|---------|
| 0 | No request | NO REQUEST(KEEPING THE CURRENT STATUS) |
| 1 | Open Request | OPEN REQUEST |
| 2 | Close Request | CLOSE REQUEST |
| 3 | reserved | |

FIG.6

2nd_Right_Door_Operate_Command

| Value | Description | Remarks |
|---|---|---|
| 0 | No request | NO REQUEST(KEEPING THE CURRENT STATUS) |
| 1 | Open Request | OPEN REQUEST |
| 2 | Close Request | CLOSE REQUEST |
| 3 | reserved | |

FIG.7

Global_Window_Command

| Value | Description | Remarks |
|-------|-------------|---------|
| 00b | No request | |
| 01b | Open | |
| 10b | Close | |

FIG.8

D_Seat_Window_Operate_Command

| Value | Description | Remarks |
|-------|-------------|---------|
| 00b | No request | |
| 01b | Open | |
| 10b | Close | |

FIG.9

Other_Window_Operate_Command

| Value | Description | Remarks |
|-------|-------------|---------|
| 00b | No request | |
| 01b | Open | |
| 10b | Close | |

FIG.13

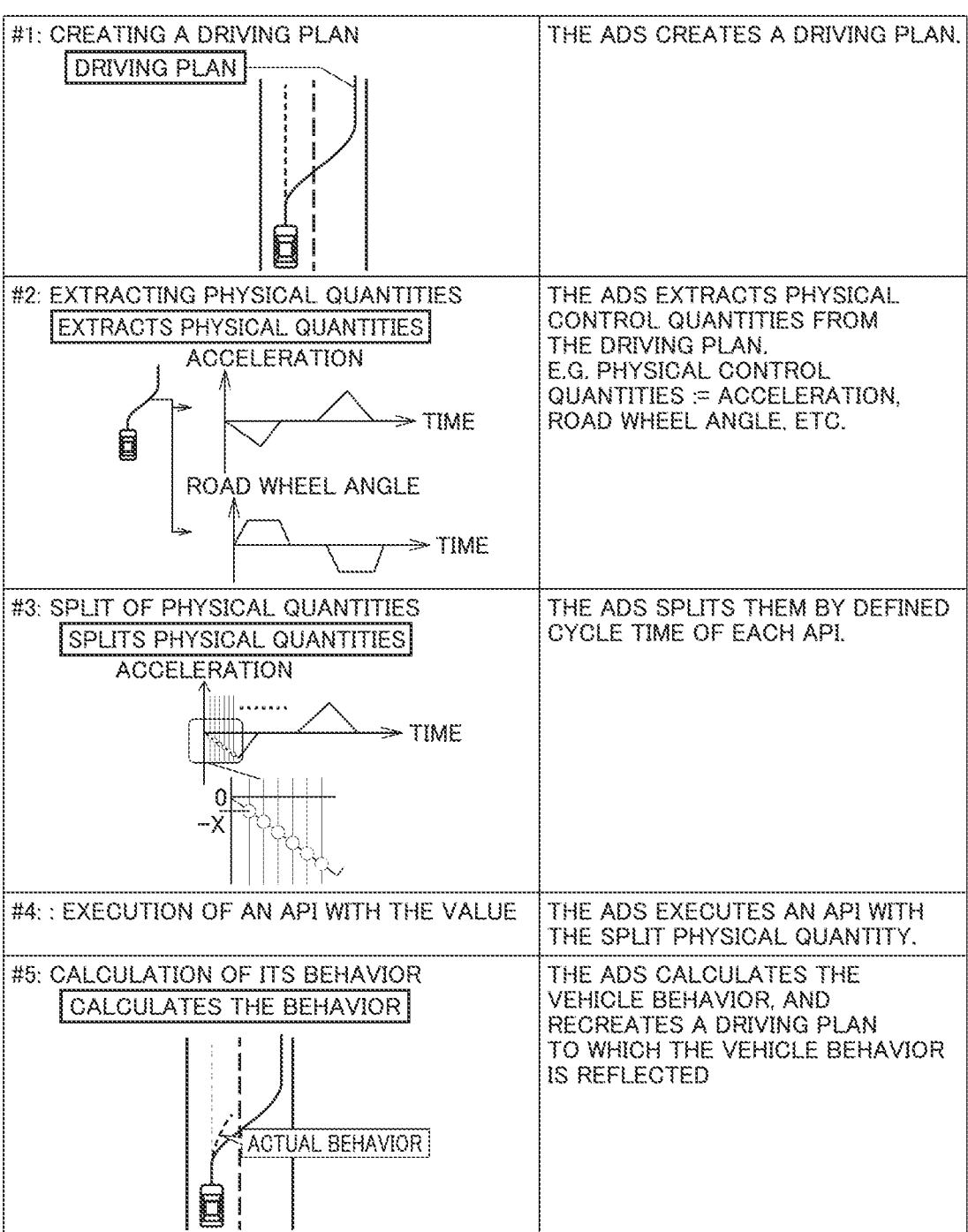

| | |
|---|---|
| #1: CREATING A DRIVING PLAN<br>DRIVING PLAN | THE ADS CREATES A DRIVING PLAN. |
| #2: EXTRACTING PHYSICAL QUANTITIES<br>EXTRACTS PHYSICAL QUANTITIES<br>ACCELERATION<br>TIME<br>ROAD WHEEL ANGLE<br>TIME | THE ADS EXTRACTS PHYSICAL CONTROL QUANTITIES FROM THE DRIVING PLAN.<br>E.G. PHYSICAL CONTROL QUANTITIES := ACCELERATION, ROAD WHEEL ANGLE, ETC. |
| #3: SPLIT OF PHYSICAL QUANTITIES<br>SPLITS PHYSICAL QUANTITIES<br>ACCELERATION<br>TIME<br>0<br>−X | THE ADS SPLITS THEM BY DEFINED CYCLE TIME OF EACH API. |
| #4: : EXECUTION OF AN API WITH THE VALUE | THE ADS EXECUTES AN API WITH THE SPLIT PHYSICAL QUANTITY. |
| #5: CALCULATION OF ITS BEHAVIOR<br>CALCULATES THE BEHAVIOR<br>ACTUAL BEHAVIOR | THE ADS CALCULATES THE VEHICLE BEHAVIOR, AND RECREATES A DRIVING PLAN TO WHICH THE VEHICLE BEHAVIOR IS REFLECTED |

FRONT WHEEL STEER ANGLE RATE LIMITATION[rad/s]

FRONT WHEEL STEER ANGLE RATE LIMITATION[rad/s]

VELOCITY[km/h]

VEHICLE

CROSS REFERENCE TO RELATED APPLICATIONS

This nonprovisional application is based on Japanese Patent Application No. 2022-158507 filed with the Japan Patent Office on Sep. 30, 2022, the entire contents of which are hereby incorporated by reference.

BACKGROUND

Field

The present disclosure relates to a vehicle configured to be capable of autonomous driving.

Description of the Background Art

Development of a technique relating to autonomous driving of a vehicle has recently progressed. For example, Japanese Patent Laying-Open No. 2018-132015 discloses a vehicle including a motive power system that manages motive power of the vehicle in a centralized manner, a power supply system that manages supply of electric power to various vehicle-mounted devices in a centralized manner, and an autonomous driving system that carries out autonomous driving control of the vehicle in a centralized manner.

In carrying out autonomous driving, an opening and closing operation of a door and a window is automatically performed in accordance with a command from the autonomous driving system. On the other hand, a user may perform the opening and closing operation of the door and the window. When a user operation and an autonomous driving system operation for the door and the window interfere with each other, for example, the vehicle stops the opening and closing operation of the door and window. In this case, the vehicle may not be able to determine whether an operation request from the autonomous driving system received after the operation was stopped is a request that has continuously been received from before the operation was stopped or a new request issued after the operation was stopped.

SUMMARY

The present disclosure was made to solve the problem above, and an object thereof is to appropriately determine whether an operation request from an autonomous driving system received after an operation was stopped due to interference between a user operation and an autonomous driving system operation is a request that has continuously been received from before the operation was stopped or a new request issued after the operation was stopped.

(1) A vehicle according to one aspect of this disclosure includes an autonomous driving system, a base vehicle on which the autonomous driving system is mountable, and a vehicle control interface box that interfaces between the base vehicle and the autonomous driving system. When a device of the base vehicle has stopped operation due to control interference caused by a user operation and an autonomous driving system operation that were simultaneously performed, the autonomous driving system transmits an operation command indicating no request to the vehicle control interface box.

According to the configuration, when the device of the base vehicle has stopped operation due to control interference caused by the user operation and an ADK operation that were simultaneously performed, the autonomous driving system transmits the operation command indicating "no request" to the vehicle control interface box. For example, when the vehicle control interface box receives the operation command indicating "no request," it can recognize an operation command received next as a new request issued after the operation was stopped. When the device of the base vehicle has stopped operation due to control interference caused by the user operation and the ADK operation that were simultaneously performed, the autonomous driving system transmits the operation command indicating "no request" to the vehicle control interface box, so that difference of the operation command subsequently transmitted from the autonomous driving system from the request that has continuously been transmitted from before the operation was stopped can be clarified.

(2) In one embodiment, the autonomous driving system transmits an operation command indicating an opening operation or a closing operation to the vehicle control interface box after the autonomous driving system transmitted the operation command indicating no request to the vehicle control interface box.

According to the configuration, the vehicle control interface box can recognize the operation command indicating the opening operation or the closing operation that is received after reception of the operation command indicating no request, as the new request issued after the operation was stopped.

(3) In one embodiment, when the device has stopped operation due to the control interference, the vehicle control interface box generates a control command in accordance with an operation command received from the autonomous driving system after the vehicle control interface box received the operation command indicating no request, and transmits the control command to the base vehicle.

According to the configuration, since the vehicle control interface box transmits to the base vehicle, the control command in accordance with the operation command (the latest operation command) received from the autonomous driving system after reception of the operation command indicating no request, the device can operate based on the latest operation command.

(4) In one embodiment, the device is a second left door of the base vehicle. The autonomous driving system transmits an operation command that requests an automatic opening and closing operation of the second left door to the vehicle control interface box. When the second left door has stopped operation due to control interference caused by the user operation for the second left door and the autonomous driving system operation based on the operation command that were simultaneously performed, the autonomous driving system transmits the operation command indicating no request to the vehicle control interface box.

According to the configuration, when the second left door has stopped operation due to control interference caused by the user operation and the ADK operation that were simultaneously performed, the autonomous driving system transmits the operation command indicating "no request" to the vehicle control interface box. Therefore, difference of the operation command subsequently transmitted from the autonomous driving system from the request that has continuously been transmitted from before the operation was stopped can be clarified.

(5) In one embodiment, when the second left door has stopped operation due to the control interference, the vehicle control interface box generates a control command in accordance with an operation command received from the autonomous driving system after the vehicle control interface box received the operation command indicating no request, and transmits the control command to the base vehicle.

According to the configuration, since the vehicle control interface box transmits to the base vehicle, the control command in accordance with the operation command (the latest operation command) received from the autonomous driving system after reception of the operation command indicating no request, the second left door can operate based on the latest operation command.

(6) In one embodiment, the device is a second right door of the base vehicle. The autonomous driving system transmits an operation command that requests an automatic opening and closing operation of the second right door to the vehicle control interface box. When the second right door has stopped operation due to control interference caused by the user operation for the second right door and the autonomous driving system operation based on the operation command that were simultaneously performed, the autonomous driving system transmits the operation command indicating no request to the vehicle control interface box.

According to the configuration, when the second right door has stopped operation due to control interference caused by the user operation and the ADK operation that were simultaneously performed, the autonomous driving system transmits the operation command indicating "no request" to the vehicle control interface box. Therefore, difference of the operation command subsequently transmitted from the autonomous driving system from the request that has continuously been transmitted from before the operation was stopped can be clarified.

(7) In one embodiment, when the second right door has stopped operation due to the control interference, the vehicle control interface box generates a control command in accordance with an operation command received from the autonomous driving system after the vehicle control interface box received the operation command indicating no request, and transmits the control command to the base vehicle.

According to the configuration, since the vehicle control interface box transmits to the base vehicle, the control command in accordance with the operation command (the latest operation command) received from the autonomous driving system after reception of the operation command indicating no request, the second right door can operate based on the latest operation command.

(8) In one embodiment, the device is all windows of the base vehicle. The autonomous driving system transmits an operation command that requests an automatic opening and closing operation of all windows to the vehicle control interface box. When all windows have stopped operation due to control interference caused by the user operation for all windows and the autonomous driving system operation based on the operation command that were simultaneously performed, the autonomous driving system transmits the operation command indicating no request to the vehicle control interface box.

According to the configuration, when all windows have stopped operation due to control interference caused by the user operation and the ADK operation that were simultaneously performed, the autonomous driving system transmits the operation command indicating "no request" to the vehicle control interface box. Therefore, difference of the operation command subsequently transmitted from the autonomous driving system from the request that has continuously been transmitted from before the operation was stopped can be clarified.

(9) In one embodiment, when all windows have stopped operation due to the control interference, the vehicle control interface box generates a control command in accordance with an operation command received from the autonomous driving system after the vehicle control interface box received the operation command indicating no request, and transmits the control command to the base vehicle.

According to the configuration, since the vehicle control interface box transmits to the base vehicle, the control command in accordance with the operation command (the latest operation command) received from the autonomous driving system after reception of the operation command indicating no request, all windows can operate based on the latest operation command.

(10) In one embodiment, the device is a driver's seat window of the base vehicle.

The autonomous driving system transmits an operation command that requests an automatic opening and closing operation of the driver's seat window to the vehicle control interface box. When the driver's seat window has stopped operation due to control interference caused by the user operation for the driver's seat window and the autonomous driving system operation based on the operation command that were simultaneously performed, the autonomous driving system transmits the operation command indicating no request to the vehicle control interface box.

According to the configuration, when the driver's seat window has stopped operation due to control interference caused by the user operation and the ADK operation that were simultaneously performed, the autonomous driving system transmits the operation command indicating "no request" to the vehicle control interface box. Therefore, difference of the operation command subsequently transmitted from the autonomous driving system from the request that has continuously been transmitted from before the operation was stopped can be clarified.

(11) In one embodiment, when the driver's seat window has stopped operation due to the control interference, the vehicle control interface box generates a control command in accordance with an operation command received from the autonomous driving system after the vehicle control interface box received the operation command indicating no request, and transmits the control command to the base vehicle.

According to the configuration, since the vehicle control interface box transmits to the base vehicle, the control command in accordance with the operation command (the latest operation command) received from the autonomous driving system after reception of the operation command indicating no request, the driver's seat window can operate based on the latest operation command.

(12) In one embodiment, the device is other windows that are windows other than a driver's seat window of the base vehicle. The autonomous driving system transmits an operation command that requests an automatic opening and closing operation of other windows to the vehicle control interface box. When other windows have stopped operation due to control interference caused by the user operation for the other windows and the autonomous driving system operation based on the operation command that were simultaneously performed, the autonomous driving system transmits the operation command indicating no request to the vehicle control interface box.

According to the configuration, when other windows have stopped operation due to control interference caused by the user operation and the ADK operation that were simultaneously performed, the autonomous driving system transmits the operation command indicating "no request" to the vehicle control interface box. Therefore, difference of the operation command subsequently transmitted from the autonomous driving system from the request that has continuously been transmitted from before the operation was stopped can be clarified.

(13) In one embodiment, when other windows have stopped operation due to the control interference, the vehicle control interface box generates a control command in accordance with an operation command received from the autonomous driving system after the vehicle control interface box received the operation command indicating no request, and transmits the control command to the base vehicle.

According to the configuration, since the vehicle control interface box transmits to the base vehicle, the control command in accordance with the operation command (the latest operation command) received from the autonomous driving system after reception of the operation command indicating no request, other windows can operate based on the latest operation command.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 5 is a diagram for illustrating a second left door operation command.

FIG. 6 is a diagram for illustrating a second right door operation command.

FIG. 7 is a diagram for illustrating a global window operation command.

FIG. 8 is a diagram for illustrating a driver's seat window operation command.

FIG. 9 is a diagram for illustrating an other window operation command.

FIG. 13 is a diagram showing a typical workflow in the ADS.

DESCRIPTION OF THE PREFERRED EMBODIMENTS

Figure 1:
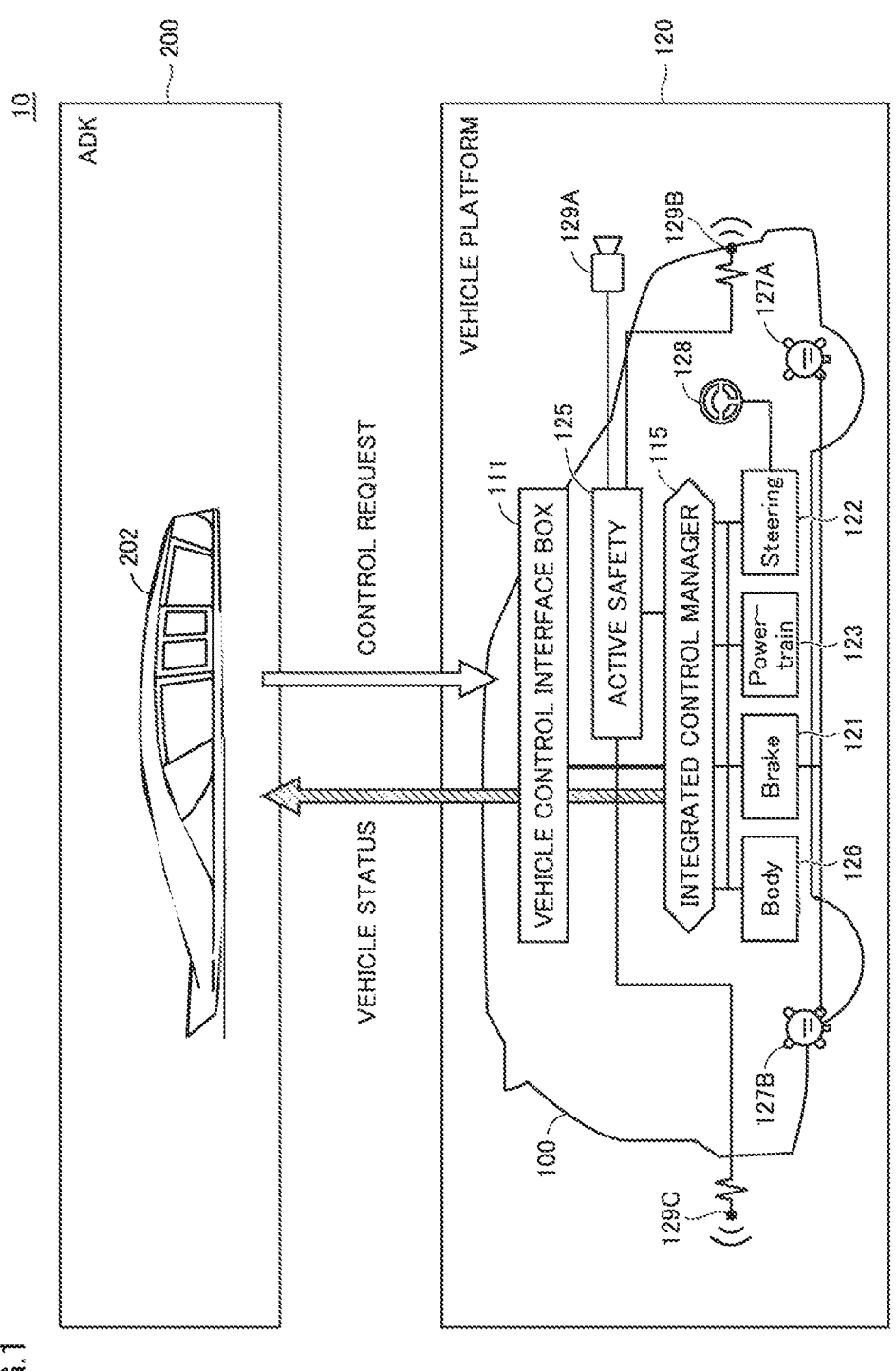
FIG. 1 is a diagram showing overview of a vehicle according to an embodiment of the present disclosure.

An embodiment of the present disclosure will be described below in detail with reference to the drawings.

The same or corresponding elements in the drawings have the same reference characters allotted and description thereof will not be repeated.

<Overall Configuration>

FIG. 1 is a diagram showing overview of a vehicle 10 according to an embodiment of the present disclosure. Referring to FIG. 1, vehicle 10 includes an autonomous driving kit (which is denoted as "ADK" below) 200 and a vehicle platform (which is denoted as "VP" below) 120. ADK 200 is configured as being attachable to (mountable on) VP 120. ADK 200 and VP 120 are configured to communicate with each other through a vehicle control interface box 111 (which will be described later) mounted on VP 120.

VP 120 can carry out autonomous driving in accordance with control requests (commands) from ADK 200. Though FIG. 1 shows VP 120 and ADK 200 at positions distant from each other, ADK 200 is actually attached to a rooftop or the like of a base vehicle 100 (which will be described later) included in VP 120. ADK 200 can also be removed from VP 120. While ADK 200 is not attached, VP 120 can travel by driving by a user. In this case, VP 120 carries out travel control (travel control in accordance with a user operation) in a manual mode.

ADK 200 includes an autonomous driving system (which is denoted as "ADS" below) 202 for autonomous driving of vehicle 10. For example, ADS 202 creates a driving plan of vehicle 10. Then, ADS 202 outputs various commands (control requests) for travel of vehicle 10 in accordance with the created driving plan to VP 120 in accordance with an application program interface (API) defined for each command. ADS 202 receives various signals indicating statuses (vehicle statuses) of VP 120 from VP 120 in accordance with the API defined for each signal. Then, ADS 202 has the received vehicle status reflected on creation of the driving plan. A detailed configuration of ADS 202 will be described later.

VP 120 includes base vehicle 100 and vehicle control interface box (which is denoted as "VCIB" below) 111.

Base vehicle 100 carries out various types of vehicle control in accordance with a control request from ADK 200 (ADS 202). Base vehicle 100 includes various systems and various sensors for controlling the vehicle. Specifically, base vehicle 100 includes an integrated control manager 115, a brake system 121, a steering system 122, a powertrain system 123, an active safety system 125, a body system 126, wheel speed sensors 127A and 127B, a pinion angle sensor 128, a camera 129A, and radar sensors 129B and 129C.

Integrated control manager 115 includes a processor and a memory, and integrally controls the systems (brake system 121, steering system 122, powertrain system 123, active safety system 125, and body system 126) involved with operations of the vehicle.

Brake system 121 is configured to control a braking apparatus provided in each wheel. The braking apparatus includes, for example, a disc brake system (not shown) that operates with a hydraulic pressure regulated by an actuator.

Wheel speed sensors 127A and 127B are connected to brake system 121. Wheel speed sensor 127A detects a rotation speed of a front wheel and outputs a detection value thereof to brake system 121. Wheel speed sensor 127B detects a rotation speed of a rear wheel and outputs a detection value thereof to brake system 121.

Brake system 121 generates a braking command to a braking apparatus in accordance with a prescribed control request outputted from ADK 200 through VCIB 111 and integrated control manager 115. Brake system 121 then controls the braking apparatus based on the generated braking command. Integrated control manager 115 can calculate a speed of the vehicle (vehicle speed) based on the rotation speed of each wheel.

Steering system 122 is configured to control a steering angle of a steering wheel of the vehicle with a steering apparatus. The steering apparatus includes, for example, rack-and-pinion electric power steering (EPS) that allows adjustment of a steering angle by an actuator.

Pinion angle sensor 128 is connected to steering system 122. Pinion angle sensor 128 detects an angle of rotation (a pinion angle) of a pinion gear coupled to a rotation shaft of the actuator included in the steering apparatus and outputs a detection value thereof to steering system 122.

Steering system 122 generates a steering command to the steering apparatus in accordance with a prescribed control request outputted from ADK 200 through VCIB 111 and integrated control manager 115. Then, steering system 122 controls the steering apparatus based on the generated steering command.

Powertrain system 123 controls an electric parking brake (EPB) system provided in at least one of a plurality of wheels, a parking lock (P-Lock) system provided in a transmission of base vehicle 100, and a propulsion system including a shift apparatus for selecting a shift range.

Active safety system 125 detects an obstacle (a pedestrian, a bicycle, a parked vehicle, a utility pole, or the like) in front or in the rear of the vehicle with the use of camera 129A and radar sensors 129B and 129C. Active safety system 125 determines whether or not vehicle 10 may collide with the obstacle based on a distance between vehicle 10 and the obstacle and a direction of movement of vehicle 10. Then, when active safety system 125 determines that there is possibility of collision, it outputs a braking command to brake system 121 through integrated control manager 115 so as to increase braking force of the vehicle.

Body system 126 is configured to control, for example, various devices such as a direction indicator, a headlight, a hazard light, a horn, a front wiper, and a rear wiper (none of which is shown), depending on a state or an environment of travel of vehicle 10. Body system 126 controls the various devices in accordance with a prescribed control request outputted from ADK 200. Body system 126 is configured to control an opening and closing apparatus (which will be described later) that operates each door (a first right door, a first left door, a second right door, and a second left door). Body system 126 is configured to control an opening and closing apparatus (which will be described later) that operates each window (a first right window, a first left window, a second right window, and a second left window). Body system 126 controls each opening and closing apparatus to operate the door and the window in accordance with a prescribed control request outputted from ADK 200.

VCIB 111 is configured to communicate with ADS 202 of ADK 200 over a controller area network (CAN). VCIB 111 receives various control requests from ADS 202 or outputs a status of VP 120 to ADS 202 by executing a prescribed API defined for each communicated signal. When VCIB 111 receives the control request from ADS 202, it outputs a control command corresponding to the control request to a system corresponding to the control command through integrated control manager 115. VCIB 111 obtains various types of information on base vehicle 100 from each system through integrated control manager 115 and outputs the status of base vehicle 100 as the vehicle status to ADS 202.

Vehicle 10 may be adopted as one of features of a mobility as a service (MaaS) system. The MaaS system further includes, for example, a data server and a mobility service platform (MSPF) (neither of which is shown), in addition to vehicle 10.

The MSPF is an integrated platform to which various mobility services are connected. Autonomous driving related mobility services are connected to the MSPF. In addition to the autonomous driving related mobility services, mobility services provided by a ride-share company, a car-sharing company, a rent-a-car company, a taxi company, and an insurance company may be connected to the MSPF. Various mobility services including mobility services can use various functions provided by the MSPF by using APIs published on the MSPF, depending on service contents.

VP 120 further includes a data communication module (DCM) (not shown) as a communication interface (UF) to wirelessly communicate with a data server of the MaaS system. The DCM outputs various types of vehicle information such as a speed, a position, or an autonomous driving state to the data server. The DCM receives from the autonomous driving related mobility services through the MSPF and the data server, various types of data for management of travel of an autonomous driving vehicle including vehicle 10 in the mobility services.

The MSPF publishes APIs for using various types of data on vehicle statuses and vehicle control necessary for development of the ADK. Various mobility services can use various functions provided by the MSPF depending on service contents, by using the APIs published on the MSPF. For example, the autonomous driving related mobility services can obtain operation control data of an autonomous driving vehicle that communicates with the data server or information stored in the data server from the MSPF by using the APIs published on the MSPF. The autonomous driving related mobility services can transmit data for managing an autonomous driving vehicle including vehicle 10 to the MSPF by using the API.

Figure 2:
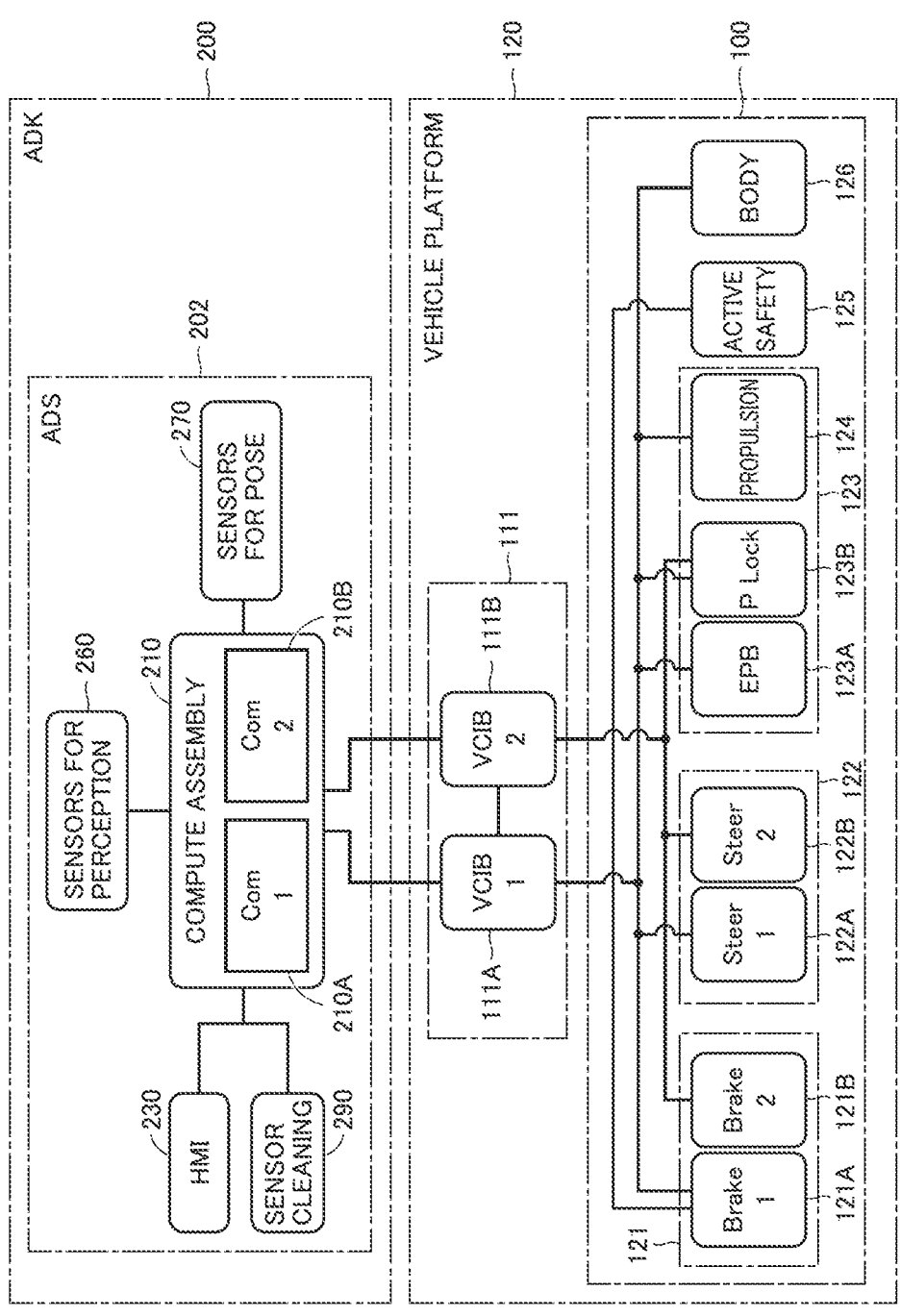
FIG. 2 is a diagram showing in further detail, a configuration of an ADK (ADS) and a VP shown in FIG. 1.

FIG. 2 is a diagram showing in further detail, a configuration of ADK 200 (ADS 202) and VP 120 shown in FIG. 1. Referring to FIG. 2, ADS 202 of ADK 200 includes a compute assembly 210, a human machine interface (HMI) 230, sensors for perception 260, sensors for pose 270, and a sensor cleaning 290.

Compute assembly 210 includes communication modules 210A and 210B. Communication modules 210A and 210B are configured to communicate with VCIB 111. During autonomous driving of vehicle 10, compute assembly 210 obtains an environment around the vehicle and a pose, a behavior, and a position of vehicle 10 from various sensors (which will be described later), and obtains a vehicle status from VP 120 through VCIB 111 and sets a next operation (acceleration, deceleration, or turning) of vehicle 10. Then, compute assembly 210 outputs various commands for realizing a set next operation to VCIB 111 in VP 120.

HMI 230 presents information to a user and accepts an operation by the user during autonomous driving, during driving requiring a user operation, or at the time of transition between autonomous driving and driving requiring an operation by the user. HMI 230 is constructed to be connected to an input and output apparatus (not shown) such as a touch panel display provided in VP 120.

Sensors for perception 260 are sensors that perceive an environment around the vehicle. Sensors for perception 260 include, for example, at least one of laser imaging detection and ranging (LIDAR), a millimeter-wave radar, and a camera.

The LIDAR refers to a distance measurement apparatus that measures a distance based on a time period from emission of pulsed laser beams (infrared rays) until return of the laser beams reflected by an object. The millimeter-wave radar is a distance measurement apparatus that measures a distance or a direction to an object by emitting radio waves short in wavelength to the object and detecting radio waves that return from the object. The camera is arranged, for example, on a rear side of a room mirror in a compartment and used for shooting the front of vehicle 10. As a result of image processing by artificial intelligence (AI) or an image processing processor onto images or video images shot by the camera, another vehicle, an obstacle, or a human in front of vehicle 10 can be recognized. Information obtained by sensors for perception 260 is output to compute assembly 210.

Sensors for pose 270 are sensors that detect a pose, a behavior, or a position of vehicle 10. Sensors for pose 270 include, for example, an inertial measurement unit (IMU) and a global positioning system (GPS).

The IMU detects, for example, an acceleration in a front-rear direction, a lateral direction, and a vertical direction of vehicle 10 and an angular speed in a roll direction, a pitch direction, and a yaw direction of vehicle 10. The GPS detects a position of vehicle 10 based on information received from a plurality of GPS satellites that orbit the Earth. Information obtained by sensors for pose 270 is output to compute assembly 210.

Sensor cleaning 290 removes soiling attached to various sensors. Sensor cleaning 290 removes soiling attached to a lens of the camera or a portion from which laser beams or radio waves are emitted, for example, with a cleaning solution or a wiper.

VCIB 111 includes a VCIB 111A and a VCIB 111B. Each of VCIBs 111A and 111B includes an electronic control unit (ECU). The ECU includes a processor such as a not-shown central processing unit (CPU) and a memory (a read only memory (ROM) and a random access memory (RAM)). A program executable by the processor is stored in the ROM. The processor performs various types of processing in accordance with the program stored in the ROM.

VCIBs 111A and 111B are communicatively connected to communication modules 210A and 210B of ADS 202, respectively. VCIB 111A and VCIB 111B are also communicatively connected to each other. Though VCIB 111B is equivalent in function to VCIB 111A, it is partially different in a plurality of systems connected thereto that make up VP 120.

VCIB s 111A and 111B each relay control requests and vehicle statuses between ADS 202 and VP 120. More specific description will be given representatively for VCIB 111A. VCIB 111A receives various control requests outputted from ADS 202 in accordance with an API defined for each control request. Then, VCIB 111A generates a command corresponding to the received control request and outputs the command to a system of base vehicle 100 corresponding to the control request. In the present embodiment, the control request received from ADS 202 includes a second left door operation command (2nd_Left_Door_Operate_Command) that requests an automatic opening and closing operation of the second left door and a second right door operation command (2nd_Right_Door_Operate_Command) that requests the automatic opening and closing operation of the second right door. The control request received from ADS 202 includes a global window operation command (Global_Window_Command) that requests the automatic opening and closing operation of all windows (windows 171 to 174), a driver's seat window operation command (D_Seat_Window_Operate_Command) that requests the automatic opening and closing operation of driver's seat window 171, and an other window operation command (Other_Window_Operate_Command) that requests the automatic opening and closing operation of other windows (windows 172 to 174) that are windows other than the driver's seat window.

VCIB 111A receives vehicle information provided from each system of VP 120 and transmits information indicating the vehicle status of VP 120 to ADS 202 in accordance with an API defined for each vehicle status. The information indicating the vehicle status to be transmitted to ADS 202 may be information identical to the vehicle information provided from each system of VP 120 or may be information extracted from the vehicle information to be used for processing performed by ADS 202.

As VCIB s 111A and 111B equivalent in function relating to an operation of at least one of (for example, braking or steering) systems are provided, control systems between ADS 202 and VP 120 are redundant. Thus, when some kind of failure occurs in a part of the system, the function (turning or stopping) of VP 120 can be maintained by switching between the control systems as appropriate or disconnecting a control system where failure has occurred.

Brake system 121 includes brake systems 121A and 121B. Steering system 122 includes steering systems 122A and 122B. Powertrain system 123 includes an EPB system 123A, a P-Lock system 123B, and a propulsion system 124.

VCIB 111A is communicatively connected to brake system 121A, steering system 122A, EPB system 123A, P-Lock system 123B, propulsion system 124, and body system 126 through a communication bus. VCIB 111B is communicatively connected to brake system 121B, steering system 122B, and P-Lock system 123 through a communication bus.

Brake systems 121A and 121B are configured to control a plurality of braking apparatuses provided in wheels. Brake system 121B may be equivalent in function to brake system 121A, or one of brake systems 121A and 121B may be configured to independently control braking force of each wheel during travel of the vehicle and the other thereof may be configured to control braking force such that equal braking force is generated in the wheels during travel of the vehicle.

Brake systems 121A and 121B each generate a braking command to the braking apparatus in accordance with a control request received from ADS 202 through VCIB 111. For example, brake systems 121A and 121B control the braking apparatus based on a braking command generated in one of the brake systems, and when a failure occurs in that brake system, the braking apparatus is controlled based on a braking command generated in the other brake system.

Steering systems 122A and 122B are configured to control a steering angle of a steering wheel of vehicle 10 with a steering apparatus. Steering system 122B is similar in function to steering system 122A.

Steering systems 122A and 122B each generate a steering command to the steering apparatus in accordance with a control request received from ADS 202 through VCIB 111. For example, steering systems 122A and 122B control the steering apparatus based on the steering command generated in one of the steering systems, and when a failure occurs in that steering system, the steering apparatus is controlled based on a steering command generated in the other steering system.

EPB system 123A is configured to control the EPB. The EPB is provided separately from the braking apparatus, and fixes a wheel by actuation of an actuator. The EPB, for example, activates a drum brake for a parking brake provided in at least one of a plurality of wheels to fix the wheel, or activates a braking apparatus to fix a wheel with an actuator capable of regulating a hydraulic pressure to be supplied to the braking apparatus separately from brake systems 121A and 121B.

EPB system 123A controls the EPB in accordance with a control request received from ADS 202 through VCIB 111.

P-Lock system 123B is configured to control a P-Lock apparatus. The P-Lock apparatus fits a protrusion provided at a tip end of a parking lock pawl, a position of which is adjusted by an actuator, into a tooth of a gear (locking gear) provided as being coupled to a rotational element in the transmission of base vehicle 100. Rotation of an output shaft of the transmission is thus fixed and the wheel is fixed.

P-Lock system 123B controls the P-Lock apparatus in accordance with a control request received from ADS 202 through VCIB 111. When the control request from ADS 202 includes a request to set the shift range to a parking range (P range), P-Lock system 123B activates the P-Lock apparatus, and when the control request includes a request to set the shift range to a shift range other than the P range, it deactivates the P-Lock apparatus.

Propulsion system 124 is configured to switch a shift range with the use of a shift apparatus and to control driving force of vehicle 10 in a direction of movement of vehicle 10 that is generated from a drive source. Switchable shift ranges include, for example, the P range, a neutral range (N range), a forward travel range (D range), and a rearward travel range (R range). The drive source includes, for example, a motor generator and an engine.

Propulsion system 124 controls the shift apparatus and the drive source in accordance with a control request received from ADS 202 through VCIB 111.

Active safety system 125 is communicatively connected to brake system 121A. As described above, active safety system 125 detects an obstacle (an obstacle or a human) in front of the vehicle by using camera 129A and radar sensor 129B, and when it determines that there is possibility of collision based on a distance to the obstacle, it outputs a braking command to brake system 121A so as to increase braking force.

Body system 126 controls various devices in accordance with a control request (control command) received from ADS 202 through VCIB 111. The various devices include, for example, a direction indicator, a headlight, a hazard light, a horn, a front wiper, and a rear wiper. The various devices include opening and closing apparatuses 165 to 168 (FIGS. 3 and 4) for the doors and opening and closing apparatuses 175 to 178 (FIGS. 3 and 4) for the windows. In other words, body system 126 controls opening and closing apparatuses 165 to 168 (FIGS. 3 and 4) for the doors and opening and closing apparatuses 175 to 178 (FIGS. 3 and 4) for the windows in accordance with the control request received from ADK 200 through VCIB 111 and integrated control manager 115.

For example, when an autonomous mode is selected as the autonomous state by an operation by the user onto HMI 230 in vehicle 10, autonomous driving is carried out. During autonomous driving, ADS 202 initially creates a driving plan as described above. Examples of the driving plan include a plan to continue straight travel, a plan to turn left/right at a prescribed intersection on a predetermined travel path, and a plan to change a travel lane.

ADS 202 calculates a controllable physical quantity (an acceleration, a deceleration, and a wheel steer angle) necessary for operations of vehicle 10 in accordance with the created driving plan. ADS 202 splits the physical quantity for each execution cycle time of the API. ADS 202 outputs a control request representing the split physical quantity to VCIB 111 by means of the API. Furthermore, ADS 202 obtains a vehicle status (an actual direction of movement of the vehicle and a state of fixation of the vehicle) from VP 120 and creates again the driving plan on which the obtained vehicle status is reflected. ADS 202 thus allows autonomous driving of vehicle 10.

Figure 3:
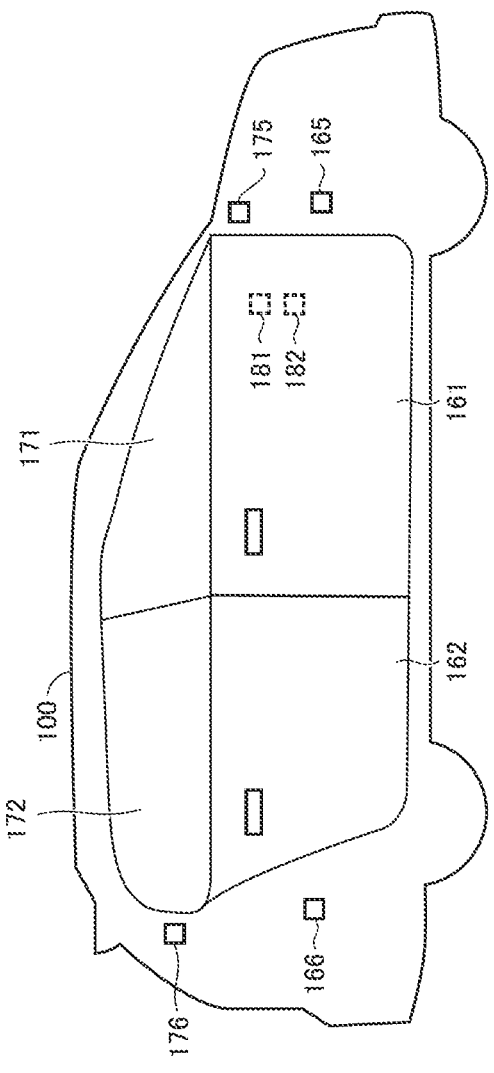
FIG. 3 is a diagram schematically showing a right side surface of a base vehicle.
Figure 4:
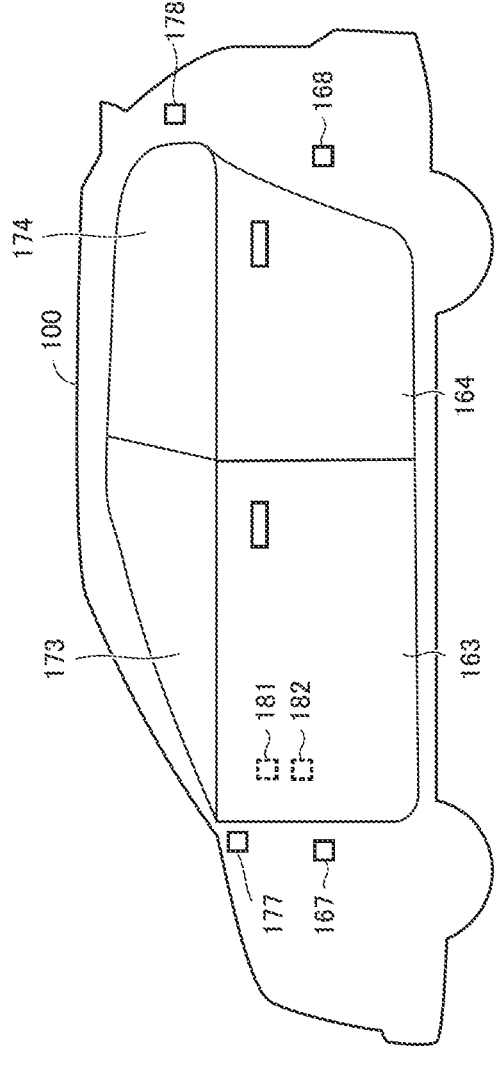
FIG. 4 is a diagram schematically showing a left side surface of the base vehicle.

FIG. 3 is a diagram schematically showing a right side surface of base vehicle 100. FIG. 4 is a diagram schematically showing a left side surface of base vehicle 100. Base vehicle 100 includes a first right door 161, a second right door 162, a first left door 163, a second left door 164, a first right window 171, a second right window 172, a first left window 173, and a second left window 174. Base vehicle 100 further includes an opening and closing apparatus 165 that opens and closes first right door 161, an opening and closing apparatus 166 that opens and closes second right door 162, an opening and closing apparatus 167 that opens and closes first left door 163, an opening and closing apparatus 168 that opens and closes second left door 164, an opening and closing apparatus 175 that opens and closes first right window 171, an opening and closing apparatus 176 that opens and closes second right window 172, an opening and closing apparatus 177 that opens and closes first left window 173, and an opening and closing apparatus 178 that opens and closes second left window 174. A driver's seat of base vehicle 100 according to the present embodiment is a first right seat. First right window 171 may be denoted as a "driver's seat window 171" below. Windows 172 to 174 other than first right window 171 may collectively be denoted as "other windows 172 to 174."

Each of opening and closing apparatuses 165 to 168 and opening and closing apparatuses 175 to 178 operates in accordance with a control signal from body system 126. Each of opening and closing apparatuses 165 to 168 includes an actuator.

Opening and closing apparatuses 165 to 168 open and close first right door 161, second right door 162, first left door 163, and second left door 164, respectively, in accordance with the control signal from body system 126. Each of opening and closing apparatuses 175 to 178 includes an actuator. Opening and closing apparatuses 175 to 178 open and close first right window 171, second right window 172, first left window 173, and second left window 174, respectively, in accordance with the control signal from body system 126. First right door 161, second right door 162, first left door 163, and second left door 164 may collectively be denoted as "doors 161 to 164" below. First right window 171, second right window 172, first left window 173, and second left window 174 may collectively be denoted as "windows 171 to 174" below.

Base vehicle 100 further includes an operation device 181 for an operation to open and close doors 161 to 164 by the user. Though a single operation device 181 that allows a concentrated operation of doors 161 to 164 is illustrated in the present embodiment, operation devices corresponding to respective doors 161 to 164 may be provided. Second right door 162 and second left door 164 may be, for example, electrical sliding doors.

Base vehicle 100 includes an operation device 182 for an operation to open and close windows 171 to 174 by the user. Though a single operation device 182 that allows a concentrated operation of windows 171 to 174 is illustrated in the present embodiment, operation devices corresponding to respective windows 171 to 174 may be provided.

<Opening and Closing of Door>

As described above, the control request received by VCIB 111 from ADS 202 includes the second left door operation command (2nd_Left_Door_Operate_Command) that requests the automatic opening and closing operation of second left door 164 of base vehicle 100 and the second right door operation command (2nd_Right_Door_Operate_Command) that requests the automatic opening and closing operation of second right door 162. The second left door operation command and the second right door operation command are converted to corresponding control commands by VCIB 111 and sent to body system 126 through integrated control manager 115. Body system 126 controls opening and closing apparatus 168 in accordance with the second left door operation command (control command) to operate second left door 164. Body system 126 controls opening and closing apparatus 166 in accordance with the second right door operation command (control command) to operate second right door 162.

FIG. 5 is a diagram for illustrating the second left door operation command. FIG. 5 shows a value (Value) that can be taken by the second left door operation command, description (Description) thereof, and remarks (Remarks).

The second left door operation command takes any one value of 0, 1, 2, and 3. The value 0 indicates "no request (keeping the current status) keeping the current status." The value 0 is set when the current operation is to be maintained (continued). The value 1 indicates an "open request." The open request is a request for an operation to open second left door 164 (opening and closing apparatus 168). The value 2 indicates a "close request." The close request is a request for an operation to close second left door 164 (opening and closing apparatus 168). The value 3 indicates "reserved (reserved)." Though the value 3 is not used in the present embodiment, it can also be set and used as appropriate.

When VCIB 111 receives the second left door operation command from ADK 200 (ADS 202), it generates a control command corresponding to the value indicated by the second left door operation command and outputs the control command to base vehicle 100. Integrated control manager 115 of base vehicle 100 outputs the control command received from VCIB 111 to body system 126. When the second left door operation command indicates the value 0, VCIB 111 generates the control command indicating "no request" and outputs the control command to body system 126. When the second left door operation command indicates the value 1, VCIB 111 generates the control command indicating "open request" and outputs the control command to body system 126. When the second left door operation command indicates the value 2, VCIB 111 generates the control command indicating "close request" and outputs the control command to body system 126. Specifically, the control command outputted from VCIB 111 is inputted to body system 126 through integrated control manager 115.

Second left door 164 is opened and closed also by an operation onto operation device 181 by the user. Operation device 181 outputs a signal in accordance with the user operation to VCIB 111. The signal may be outputted to VCIB 111, for example, through body system 126.

When the signal from operation device 181 for operating second left door 164 and the second left door operation command from ADK 200 request different operations (interfere with each other), VCIB 111 generates a control command to stop the operation of second left door 164 and outputs the control command to body system 126. In other words, in the event of occurrence of control interference caused by the "user operation" onto operation device 181 for second left door 164 and the "ADK operation" indicated by the second left door operation command from ADK 200 that are simultaneously performed, VCIB 111 generates the control command to stop the operation of second left door 164. Base vehicle 100 (body system 126) follows this control command, so that the operation of second left door 164 is stopped.

While the operation of second left door 164 has been stopped, VCIB 111 may not be able to appropriately determine whether the second left door operation command received from ADK 200 is a request that has continuously been transmitted from before second left door 164 stopped operation or a new request issued after the operation was stopped. It is assumed as a specific example that VCIB 111 receives, for example, a close request from ADK 200 and receives an open request from operation device 181. In this case, since the ADK operation and the user operation interfere with each other, VCIB 111 generates the control command to stop the operation of second left door 164. In accordance with this control command, body system 126 operates and the operation of second left door 164 is stopped. When VCIB 111 receives the close request from ADK 200 in this state, VCIB 111 is unable to appropriately determine whether the close request is the request that has continuously been transmitted from before second left door 164 stopped operation or the new request issued after the operation was stopped.

When second left door 164 has stopped operation due to control interference caused by the user operation and the ADK operation that were simultaneously performed, ADK 200 once transmits the second left door operation command indicating "no request (No request)" to VP 120 (VCIB 111). After ADK 200 transmits the second left door operation command indicating "no request," it transmits the second left door operation command which is a next command (new request) to VP 120. When VCIB 111 receives the second left door operation command indicating "no request" while second left door 164 has stopped operation due to control interference, it recognizes the second left door operation command received after the second left door operation command, as the new request issued after the operation was stopped. In this case, VCIB 111 generates the control command corresponding to the value indicated by the second left door operation command determined as the new request, and outputs the control command to base vehicle 100.

When VCIB 111 does not receive the second left door operation command indicating "no request" while second left door 164 has stopped operation due to control interference, it recognizes the received second left door operation command as the request that has continuously been transmitted from before second left door 164 stopped operation. In this case, VCIB 111 generates the control command to keep the operation of second left door 164 stopped and outputs the control command to base vehicle 100.

For example, ADK 200 can determine that second left door 164 has stopped operation due to control interference caused by the user operation and the ADK operation that were simultaneously performed, based on information indicating a vehicle status that is received from VCIB 111.

As set forth above, when second left door 164 has stopped operation due to control interference caused by the user operation and the ADK operation that were simultaneously performed, ADK 200 transmits the second left door operation command indicating "no request" so that VCIB 111 can determine the second left door operation command received after the second left door operation command indicating "no request" as the new request issued after the operation was stopped.

FIG. 6 is a diagram for illustrating the second right door operation command. FIG. 6 shows a value (Value) that can be taken by the second right door operation command, description (Description) thereof, and remarks (Remarks).

The second right door operation command takes any one value of 0, 1, 2, and 3. The value 0 indicates "no request (keeping the current status) keeping the current status." The value 0 is set when the current operation is to be maintained (continued). The value 1 indicates an "open request." The open request is a request for an operation to open second right door 162 (opening and closing apparatus 166). The value 2 indicates a "close request." The close request is a request for an operation to close second right door 162 (opening and closing apparatus 166). The value 3 indicates "reserved (Reserved)." Though the value 3 is not used in the present embodiment, it can also be set and used as appropriate.

When VCIB 111 receives the second right door operation command from ADK 200 (ADS 202), it generates a control command corresponding to the value indicated by the second right door operation command and outputs the control command to base vehicle 100. Integrated control manager 115 of base vehicle 100 outputs the control command received from VCIB 111 to body system 126. When the second right door operation command indicates the value 0, VCIB 111 generates the control command indicating "no request" and outputs the control command to body system 126. When the second right door operation command indicates the value 1, VCIB 111 generates the control command indicating the "open request" and outputs the control command to body system 126. When the second right door operation command indicates the value 2, VCIB 111 generates the control command indicating the "close request" and outputs the control command to body system 126.

Second right door 162 is opened and closed also by an operation onto operation device 181 by the user, similarly to second left door 164. When the signal from operation device 181 for operating second right door 162 and the second right door operation command from ADK 200 request different operations (interfere with each other), VCIB 111 generates a control command to stop the operation of second right door 162 and outputs the control command to body system 126. In other words, in the event of occurrence of control interference caused by the "user operation" onto operation device 181 for second right door 162 and the "ADK operation" indicated by the second right door operation command from ADK 200 that are simultaneously performed, VCIB 111 generates the control command to stop the operation of second right door 162. Base vehicle 100 (body system 126) follows this control command, so that the operation of second right door 162 is stopped.

When second right door 162 has stopped operation due to control interference caused by the user operation and the ADK operation that were simultaneously performed, ADK 200 once transmits the second right door operation command indicating "no request (No request)" to VP 120 (VCIB 111). After ADK 200 transmits the second right door operation command indicating "no request," it transmits the second right door operation command which is a next command (new request) to VP 120. When VCIB 111 receives the second right door operation command indicating "no request" while second right door 162 has stopped operation due to control interference, it recognizes the second right door operation command received after the second right door operation command as the new request issued after the operation was stopped. In this case, VCIB 111 generates the control command corresponding to the value indicated by the second right door operation command determined as the new request, and outputs the control command to base vehicle 100.

When VCIB 111 does not receive the second right door operation command indicating "no request" while second right door 162 has stopped operation due to control interference, it recognizes the received second right door operation command as the request that has continuously been transmitted from before second right door 162 stopped operation. In this case, VCIB 111 generates the control command to keep the operation of second right door 162 stopped and outputs the control command to base vehicle 100.

As set forth above, when second right door 162 has stopped operation due to control interference caused by the user operation and the ADK operation that were simultaneously performed, ADK 200 transmits the second right door operation command indicating "no request" so that VCIB 111 can determine the second right door operation command received after the second right door operation command indicating "no request" as the new request issued after the operation was stopped.

<Opening and Closing of Window>

As described above, the control request received by VCIB 111 from ADS 202 includes the global window operation command (Global_Window_Command) that requests the automatic opening and closing operation of all windows (windows 171 to 174), the driver's seat window operation command (D_Seat_Window_Operate_Command) that requests the automatic opening and closing operation of driver's seat window 171, and the other window operation command (Other_Window_Operate_Command) that requests the automatic opening and closing operation of other windows 172 to 174 that are windows other than the driver's seat window. These operation commands are converted to corresponding control commands by VCIB 111 and sent to body system 126 through integrated control manager 115. Body system 126 controls opening and closing apparatuses 175 to 178 in accordance with the global window operation command to operate all windows (windows 171 to 174). Body system 126 controls opening and closing apparatus 175 in accordance with the driver's seat window operation command to operate driver's seat window 171. Body system 126 controls opening and closing apparatuses 176 to 178 in accordance with the other window operation command to operate other windows 172 to 174.

FIG. 7 is a diagram for illustrating the global window operation command. FIG. 7 shows a value (Value) that can be taken by the global window operation command, description (Description) thereof, and remarks (Remarks).

The global window operation command takes any one value of 00b, 01b, and 10b. The value 00b indicates "no request (No request)." The value 01b indicates "open (Open)." The value 10b indicates "close (Close)."

When VCIB 111 receives the global window operation command from ADK 200 (ADS 202), it generates the control command corresponding to the value indicated by the global window operation command and outputs the control command to base vehicle 100. Integrated control manager 115 of base vehicle 100 outputs the control command received from VCIB 111 to body system 126. When the global window operation command indicates the value 00b, VCIB 111 generates the control command indicating "no request" and outputs the control command to body system 126. When the global window operation command indicates the value 01b, VCIB 111 generates the control command indicating "open" and outputs the control command to body system 126. When the global window operation command indicates the value 10b, VCIB 111 generates the control command indicating "close" and outputs the control command to body system 126.

While VCIB 111 receives the global window operation command, it generates a control command, for example, to perform the opening and closing operation of all windows. When another request (for example, a user operation onto operation device 182 (that is, manual control)) is issued while the control command corresponding to the global window operation command is being outputted, VCIB 111 does not accept the global window operation command.

Windows 171 to 174 are opened and closed also by an operation onto operation device 182 by the user. Operation device 182 outputs a signal in accordance with the user operation to VCIB 111. The signal may be outputted to VCIB 111, for example, through body system 126.

When the signal from operation device 182 for operating windows 171 to 174 and the global window operation command from ADK 200 request operations different from each other (interfere with each other), VCIB 111 generates a control command to stop the operation of windows 171 to 174 and outputs the control command to body system 126. In other words, in the event of occurrence of control interference caused by the "user operation" onto operation device 182 for at least one of windows 171 to 174 and the "ADK operation" indicated by the global window operation command from ADK 200 that are simultaneously performed, VCIB 111 generates the control command to stop the operation of windows 171 to 174. Base vehicle 100 (body system 126) follows this control command, so that the operation of windows 171 to 174 is stopped.

When all windows (windows 171 to 174) have stopped operation due to control interference caused by the user operation and the ADK operation that were simultaneously performed, ADK 200 once transmits the global window operation command indicating "no request (No request)" to VP 120 (VCIB 111). After ADK 200 transmits the global window operation command indicating "no request," it transmits the global window operation command which is a next command (new request) to VP 120. When VCIB 111 receives the global window operation command indicating "no request" while all windows have stopped operation due to control interference, it recognizes the global window operation command received after the global window operation command as the new request issued after the operation was stopped. In this case, VCIB 111 generates the control command corresponding to the value indicated by the global window operation command determined as the new request, and outputs the control command to base vehicle 100.

When VCIB 111 does not receive the global window operation command indicating "no request" while all windows have stopped operation due to control interference, it recognizes the received global window operation command as the request that has continuously been transmitted from before all windows stopped operation. In this case, VCIB 111 generates the control command to keep the operation of all windows stopped and outputs the control command to base vehicle 100.

As set forth above, when all windows have stopped operation due to control interference caused by the user operation and the ADK operation that were simultaneously performed, ADK 200 transmits the global window operation command indicating "no request" so that VCIB 111 can determine the global window operation command received after the global window operation command indicating "no request" as the new request issued after the operation was stopped.

FIG. 8 is a diagram for illustrating the driver's seat window operation command. FIG. 8 shows a value (Value) that can be taken by the driver's seat window operation command, description (Description) thereof, and remarks (Remarks).

The driver's seat window operation command takes any one value of 00b, 01b, and 10b. The value 00b indicates "no request (No request)." The value 01b indicates "open (Open)." The value 10b indicates "close (Close)."

When VCIB 111 receives the driver's seat window operation command from ADK 200 (ADS 202), it generates the control command corresponding to the value indicated by the driver's seat window operation command and outputs the control command to base vehicle 100. Integrated control manager 115 of base vehicle 100 outputs the control command received from VCIB 111 to body system 126. When the driver's seat window operation command indicates the value 00b, VCIB 111 generates the control command indicating "no request" and outputs the control command to body system 126. When the driver's seat window operation command indicates the value 01b, VCIB 111 generates the control command indicating "open" and outputs the control command to body system 126. When the driver's seat window operation command indicates the value 10b, VCIB 111 generates the control command indicating "close" and outputs the control command to body system 126.

While VCIB 111 receives the driver's seat window operation command, it generates a control command, for example, to perform the opening and closing operation of driver's seat window 171. When another request for driver's seat window 171 (for example, a user operation onto operation device 182 (that is, manual control)) is issued while the control command corresponding to the driver's seat window operation command is being outputted, VCIB 111 does not accept the driver's seat window operation command.

Driver's seat window 171 is opened and closed also by an operation onto operation device 182 by the user. When the signal from operation device 182 for operating driver's seat window 171 and the driver's seat window operation command from ADK 200 request operations different from each other (interfere with each other), VCIB 111 generates a control command to stop the operation of driver's seat window 171 and outputs the control command to body system 126. In other words, in the event of occurrence of control interference caused by the "user operation" onto operation device 182 for driver's seat window 171 and the "ADK operation" indicated by the driver's seat window operation command from ADK 200 that are simultaneously performed, VCIB 111 generates the control command to stop the operation of driver's seat window 171. Base vehicle 100 (body system 126) follows this control command, so that the operation of driver's seat window 171 is stopped.

When driver's seat window 171 has stopped operation due to control interference caused by the user operation and the ADK operation that were simultaneously performed, ADK 200 once transmits the driver's seat window operation command indicating "no request (No request)" to VP 120 (VCIB 111). After ADK 200 transmits the driver's seat window operation command indicating "no request," it transmits the driver's seat window operation command which is a next command (new request) to VP 120. When VCIB 111 receives the driver's seat window operation command indicating "no request" while driver's seat window 171 has stopped operation due to control interference, it recognizes the driver's seat window operation command received after the driver's seat window operation command as the new request issued after the operation was stopped. In this case, VCIB 111 generates the control command corresponding to the value indicated by the driver's seat window operation command determined as the new request and outputs the control command to base vehicle 100.

When VCIB 111 does not receive the driver's seat window operation command indicating "no request" while driver's seat window 171 has stopped operation due to control interference, it recognizes the received driver's seat window operation command as the request that has continuously been transmitted from before driver's seat window 171 stopped operation. In this case, VCIB 111 generates the control command to keep the operation of driver's seat window 171 stopped and outputs the control command to base vehicle 100.

As set forth above, when driver's seat window 171 has stopped operation due to control interference caused by the user operation and the ADK operation that were simultaneously performed, ADK 200 transmits the driver's seat window operation command indicating "no request" so that VCIB 111 can determine the driver's seat window operation command received after the driver's seat window operation command indicating "no request" as the new request issued after the operation was stopped.

FIG. 9 is a diagram for illustrating the other window operation command. FIG. 9 shows a value (Value) that can be taken by the other window operation command, description (Description) thereof, and remarks (Remarks).

The other window operation command takes any one value of 00b, 01b, and 10b. The value 00b indicates "no request (No request)." The value 01b indicates "open (Open)." The value 10b indicates "close (Close)."

When VCIB 111 receives the other window operation command from ADK 200 (ADS 202), it generates the control command corresponding to the value indicated by the other window operation command and outputs the control command to base vehicle 100. Integrated control manager 115 of base vehicle 100 outputs the control command received from VCIB 111 to body system 126. When the other window operation command indicates the value 00b, VCIB 111 generates the control command indicating "no request" and outputs the control command to body system 126. When the other window operation command indicates the value 01b, VCIB 111 generates the control command indicating "open" and outputs the control command to body system 126. When the other window operation command indicates the value 10b, VCIB 111 generates the control command indicating "close" and outputs the control command to body system 126.

While VCIB 111 receives the other window operation command, it generates a control command, for example, to perform the opening and closing operation of other windows 172 to 174. When another request for other windows 172 to 174 (for example, a user operation onto operation device 182 (that is, manual control)) is issued while the control command corresponding to the other window operation command is being outputted, VCIB 111 does not accept the other window operation command.

Other windows 172 to 174 are opened and closed also by an operation onto operation device 182 by the user. When the signal from operation device 182 for operating other windows 172 to 174 and the other window operation command from ADK 200 request operations different from each other (interfere with each other), VCIB 111 generates a control command to stop the operation of other windows 172 to 174 and outputs the control command to body system 126. In other words, in the event of occurrence of control interference caused by the "user operation" onto operation device 182 for other windows 172 to 174 and the "ADK operation" indicated by the other window operation command from ADK 200 that are simultaneously performed, VCIB 111 generates the control command to stop the operation of other windows 172 to 174. Base vehicle 100 (body system 126) follows this control command, so that the operation of other windows 172 to 174 is stopped.

When other windows 172 to 174 have stopped operation due to control interference caused by the user operation and the ADK operation that were simultaneously performed, ADK 200 once transmits the other window operation command indicating "no request (No request)" to VP 120 (VCIB 111). After ADK 200 transmits the other window operation command indicating "no request," it transmits the other window operation command which is a next command (new request) to VP 120. When VCIB 111 receives the other window operation command indicating "no request" while other windows 172 to 174 have stopped operation due to control interference, it recognizes the other window operation command received after the other window operation command as the new request issued after the operation was stopped. In this case, VCIB 111 generates the control command corresponding to the value indicated by the other window operation command determined as the new request and outputs the control command to base vehicle 100.

When VCIB 111 does not receive the other window operation command indicating "no request" while other windows 172 to 174 have stopped operation due to control interference, it recognizes the received other window operation command as the request that has continuously been transmitted from before other windows 172 to 174 stopped operation. In this case, VCIB 111 generates the control command to keep the operation of other windows 172 to 174 stopped and outputs the control command to base vehicle 100.

As set forth above, when other windows 172 to 174 have stopped operation due to control interference caused by the user operation and the ADK operation that were simultaneously performed, the other window operation command indicating "no request" is transmitted so that VCIB 111 can determine the other window operation command received after the other window operation command indicating "no request" as the new request issued after the operation was stopped.

<Flowchart>

Figure 10:
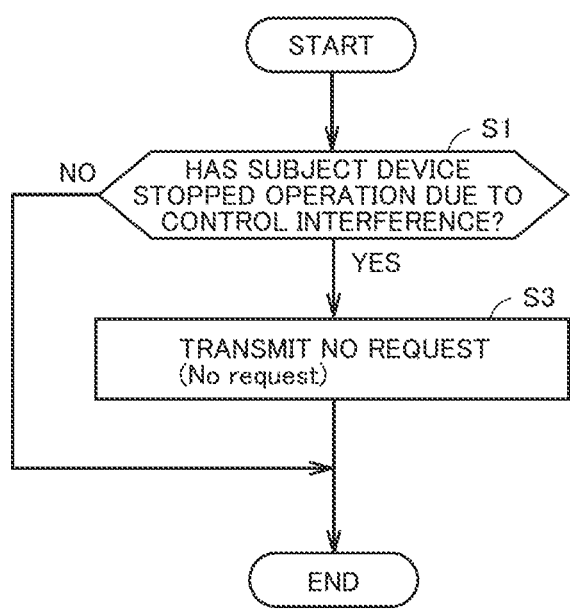
FIG. 10 is a flowchart showing a procedure in processing performed by the ADK.

FIG. 10 is a flowchart showing a procedure in processing performed by ADK 200. The processing in the flowchart in FIG. 10 is invoked from a main routine in prescribed cycles. Though the processing in the flowchart in FIG. 10 is described as being implemented by software processing by ADK 200, a part or the entirety thereof may be implemented by hardware (electric circuitry) made in ADK 200.

In S1, ADK 200 determines whether or not a subject device has stopped operation due to control interference caused by the user operation and the ADK operation that were simultaneously performed. In the present embodiment, the subject device is any of second left door 164, second right door 162, all windows (windows 171 to 174), driver's seat window 171, and other windows 172 to 174. When ADK 200 determines that the subject device has stopped operation due to control interference caused by the user operation and the ADK operation that were simultaneously performed (YES in S1), the process proceeds to S3. When ADK 200 does not determine that the subject device has stopped operation due to control interference caused by the user operation and the ADK operation that were simultaneously performed (NO in S1), the process ends.

In S3, ADK 200 transmits to VP 120 (VCIB 111), the control request (operation command) indicating "no request (No request)" corresponding to the subject device that has stopped operation. Specifically, when second left door 164 has stopped operation due to control interference caused by the user operation and the ADK operation that were simultaneously performed, ADK 200 transmits the second left door operation command indicating "no request" to VP 120 (VCIB 111). When second right door 162 has stopped operation due to control interference caused by the user operation and the ADK operation that were simultaneously performed, ADK 200 transmits the second right door operation command indicating "no request" to VP 120 (VCIB 111). When all windows have stopped operation due to control interference caused by the user operation and the ADK operation that were simultaneously performed, ADK 200 transmits the global window operation command indicating "no request" to VP 120 (VCIB 111). When driver's seat window 171 has stopped operation due to control interference caused by the user operation and the ADK operation that were simultaneously performed, ADK 200 transmits the driver's seat window operation command indicating "no request" to VP 120 (VCIB 111). When other windows 172 to 174 have stopped operation due to control interference caused by the user operation and the ADK operation that were simultaneously performed, ADK 200 transmits the other window operation command indicating "no request" to VP 120 (VCIB 111).

When the subject device has stopped operation due to control interference caused by the user operation and the ADK operation that were simultaneously performed, VCIB 111 receives the operation command indicating "no request" from ADK 200, so that VCIB 111 can recognize the operation command received after the operation command indicating "no request" as the new request issued after the operation was stopped.

As set forth above, in vehicle 10 according to the present embodiment, when the subject device has stopped operation due to control interference caused by the user operation and the ADK operation that were simultaneously performed, ADK 200 once transmits the operation command indicating "no request" to VP 120 (VCIB 111). When the subject device has stopped operation due to control interference caused by the user operation and the ADK operation that were simultaneously performed, VCIB 111 receives the operation command indicating "no request" from ADK 200 so that VCIB 111 can recognize the operation command received after the operation command indicating "no request" as the new request issued after the operation was stopped.

EXAMPLE

API Specification for TOYOTA Vehicle Platform
  Ver. 1.1
Records of Revision

| Date of Revision | ver. | Overview of Revision | Reviser |
|---|---|---|---|
| 2020 May 23 | 1.0 | Creating a new material | TOYOTA MOTOR Corp, |
| 2021 Apr. 14 | 1.1 | The figure of Front Wheel Steer Angle Rate Limitation is updated. Explanation of Standstill Status is added. | TOYOTA MOTOR Corp. |

Table of Contents

1. Introduction
  1.1. Purpose of this Specification
  1.2. Target Vehicle
  1.3. Definition of Term
2. Structure
  2.1. Overall Structure of Autono-MaaS Vehicle
  2.2. System Structure of Autono-MaaS Vehicle
3. Application Interfaces
  3.1. Typical Usage of APIs
  3.2. APIs for Vehicle Motion Control
    3.2.1. API List for Vehicle Motion Control
    3.2.2. Details of Each API for Vehicle Motion Control
  3.3. APIs for BODY Control
    3.3.1. API List for BODY Control
    3.3.2. Details of Each API for BODY Control
  3.4. APIs for Power Control
    3.4.1. API List for Power Control
    3.4.2. Details of Each API for Power Control
  3.5. APIs for Failure Notification
    3.5.1. API List for Failure Notification
    3.5.2. Details of Each API for Failure Notification
  3.6. APIs for Security
    3.6.1. API List for Security
    3.6.2. Details of Each API for Security
4. API Guides to Control Toyota Vehicles
  4.1. APIs for Vehicle Motion Control
    4.1.1. API List for Vehicle Motion Control
    4.1.2. API Guides in Details for Vehicle Motion Control
  4.2. APIs for BODY Control
    4.2.1. API List for BODY Control
  4.3. APIs for Power Control
    4.3.1. API List for Power Control
  4.4. APIs for Failure Notification
    4.4.1. API List for Failure Notification
  4.5. APIs for Security
    4.5.1. API List for Security
    4.5.2. API Guides in Details for Security

1. Introduction

1.1. Purpose of this Specification

This document is an API specification of vehicle control interface for Autono-MaaS vehicles and contains outline, the way to use and note of APIs.

1.2. Target Vehicle

This specification is applied to the Autono-MaaS vehicles defined by [Architecture Specification for TOYOTA Vehicle Platform attached with Automated Driving System].

1.3. Definition of Term

TABLE 1

| Definition of Term | |
| --- | --- |
| Term | Definition |
| ADS | Autonomous Driving System |
| ADK | Autonomous Driving Kit |
| VP | Vehicle Platform |
| VCIB | Vehicle Control Interface Box. This is an ECU for the interface and the signal converter between ADS and VP's sub systems. |
| PCS | Pre-Collision Safety |

2. Structure 2.1. Overall Structure of Autono-MaaS Vehicle

Figure 11:
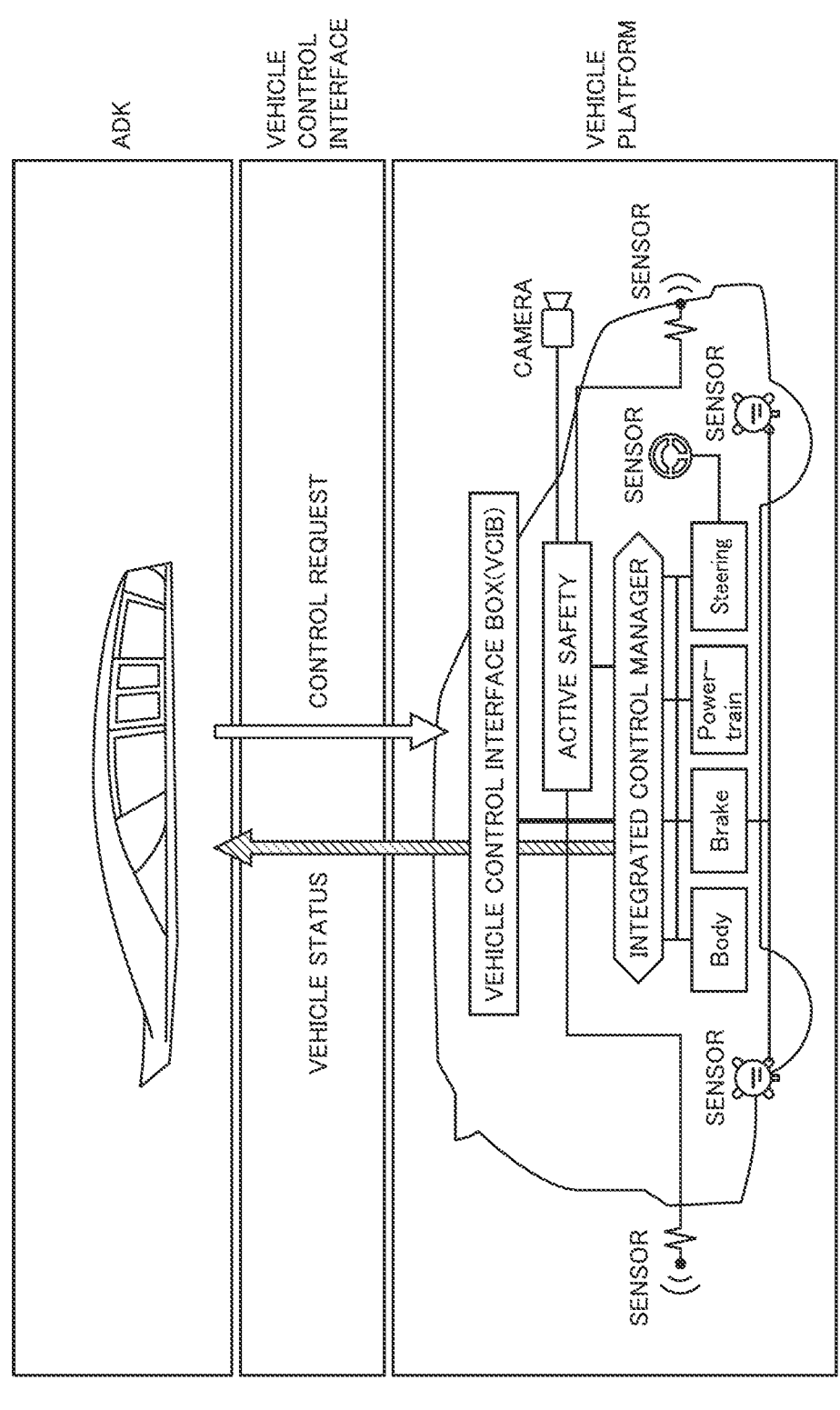
FIG. 11 is a diagram showing an overall structure of an Autono-MaaS vehicle.

The overall structure of Autono-MaaS is shown (FIG. 11).

2.2. System Structure of Autono-MaaS Vehicle

Figure 12:
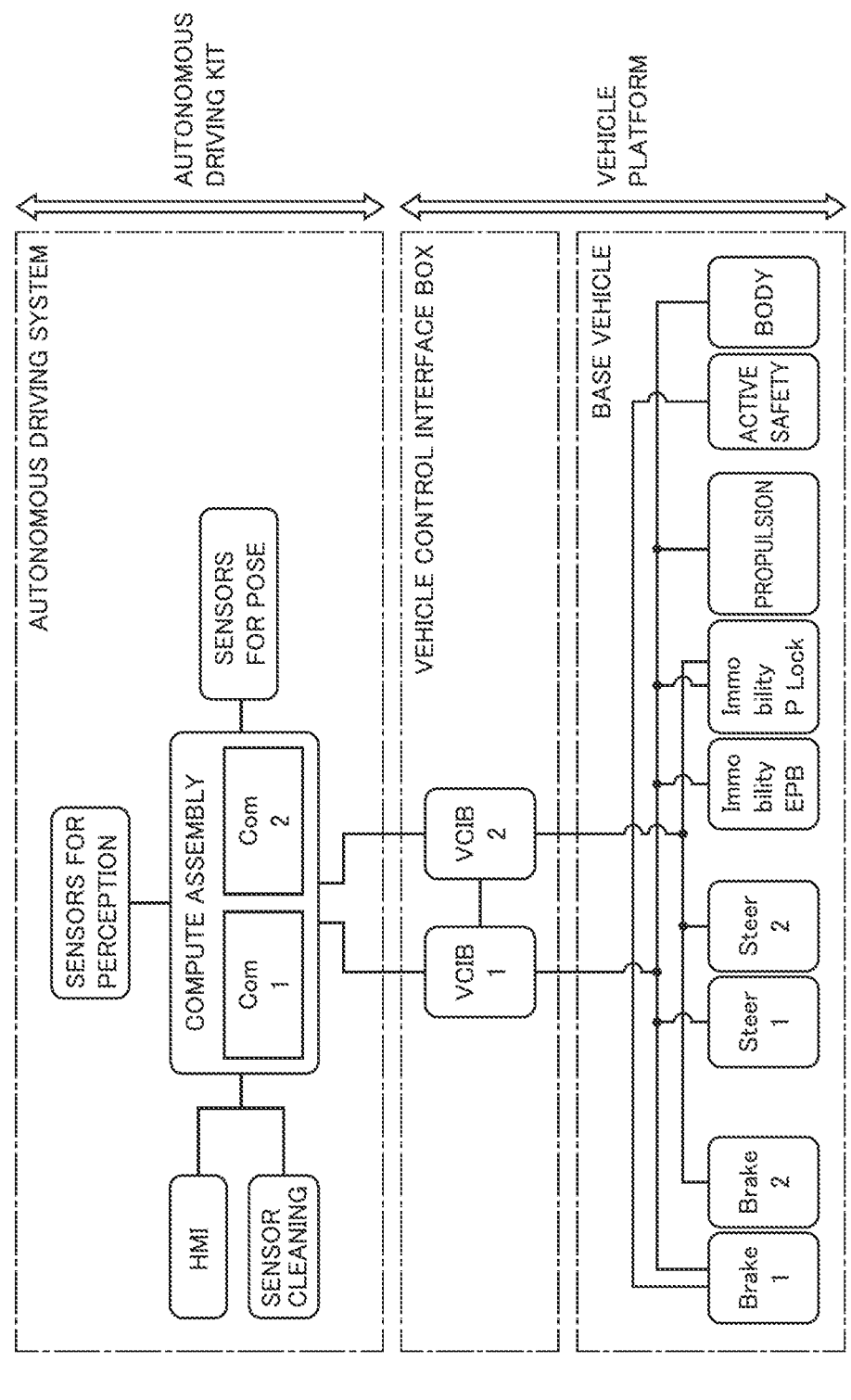
FIG. 12 is a diagram showing a system architecture of the Autono-MaaS vehicle.

System Architecture is shown in FIG. 12.

3. Application Interfaces 3.1. Typical Usage of APIs

In this section, Typical Usage of APIs is described.

A typical workflow of APIs is as follows (FIG. 13). The following example assumes CAN for physical communication.

3.2. APIs for vehicle motion control

In this section, the APIs for vehicle motion control are described.

3.2.1. API List for Vehicle Motion Control 3.2.1.1. Inputs

TABLE 3

| Input APIs for vehicle motion control | | |
| --- | --- | --- |
| Signal Name | Description | Redundancy |
| Propulsion Direction Command | Request for shift change from/to forward (D range) to/from back (R range) | N/A |
| Immobilization Command | Request for turning on/off WheelLock | Applied |
| Standstill Command | Request for keeping on/off stationary | Applied |
| Acceleration Command | Request for acceleration/deceleration | Applied |
| Front Wheel Steer Angle Command | Request for front wheel steer angle | Applied |
| Vehicle Mode Command | Request for changing from/to manual mode to/from Autonomous Mode | Applied |
| High Dynamics Command | Request for increasing braking response performance* | Applied |

*Reaction time in VP upon a request from ADK 3.2.1.2. Outputs

TABLE 4

| Output APIs for vehicle motion control | | |
| --- | --- | --- |
| Signal Name | Description | Redundancy |
| Propulsion Direction Status | Current shift status | N/A |
| Immobilization Status | Status of immobilization (i.e. EPB and Shift P) | Applied |
| Standstill Status | Standstill status | N/A |
| Estimated Gliding Acceleration | Estimated vehicle acceleration/deceleration when throttle is fully closed | N/A |
| Estimated maximum acceleration | Estimated maximum acceleration | Applied |
| Estimated maximum deceleration | Estimated maximum deceleration | Applied |
| Front wheel steer angle | Front wheel steer angle | Applied |
| Front wheel steer angle rate | Front wheel steer angle rate | Applied |
| Front wheel steer angle rate limitation | Road wheel angle rate limit | Applied |
| Estimated maximum lateral acceleration | Estimated max lateral acceleration | Applied |
| Estimated maximum lateral acceleration rate | Estimated max lateral acceleration rate | Applied |
| Intervention of accelerator pedal | This signal shows whether the accelerator pedal is depressed by a driver (intervention) | N/A |
| Intervention of brake pedal | This signal shows whether the brake pedal is depressed by a driver (Intervention) | N/A |
| Intervention of steering wheel | This signal shows whether the steering wheel is turned by a driver (intervention) | N/A |
| Intervention of shift lever | This signal shows whether the shift lever is controlled by a driver (Intervention) | N/A |
| Wheel speed pulse (front left) | Pulse from wheel speed sensor (Front Left Wheel) | N/A |
| Wheel rotation direction (front left) | Rotation direction of wheel (Front Left) | N/A |
| Wheel speed pulse (front right) | Pulse from wheel speed sensor (Front Right Wheel) | N/A |
| Wheel rotation direction (front right) | Rotation direction of wheel (Front Right) | N/A |
| Wheel speed pulse (rear left) | Pulse from wheel speed sensor (Rear Left Wheel) | Applied |
| Wheel rotation direction (Rear left) | Rotation direction of wheel (Rear Left) | Applied |
| Wheel speed pulse (rear right) | Pulse from wheel speed sensor (Rear Right Wheel) | Applied |
| Wheel rotation direction (Rear right) | Rotation direction of wheel (Rear Right) | Applied |
| Traveling direction | Moving direction of vehicle | Applied |
| Vehicle velocity | Estimated longitudinal velocity of vehicle | Applied |
| Longitudinal acceleration | Estimated longitudinal acceleration of vehicle | Applied |
| Lateral acceleration | Sensor value of lateral acceleration of vehicle | Applied |
| Yawrate | Sensor value of yaw rate | Applied |
| Slipping Detection | Detection of tire glide/spin/skid | Applied |

TABLE 4-continued

| Output APIs for vehicle motion control | | |
|---|---|---|
| Signal Name | Description | Redundancy |
| Vehicle mode state | State of whether Autonomous Mode, manual mode | Applied |
| Readiness for autonomization | Situation of whether the vehicle can transition to Autonomous Mode or not | Applied |
| Failure status of VP functions for Autonomous Mode | This signal is used to show whether VP functions have some failures mode when a vehicle works as Autonomous Mode. | Applied |
| PCS Alert Status | Status of PCS (Alert) | N/A |
| PCS Preparation Status | Status of PCS (Prefill) | N/A |
| PCS Brake/PCS Brake Hold Status | Status of PCS (PB/PBH) | N/A |
| ADS/PCS arbitration status | ADS/PCS arbitration status | N/A |

3.2.2. Details of Each API for Vehicle Motion Control

3.2.2.1. Propulsion Direction Command

Request for shift change from/to forward (D range) to/from back (R range)

Values

| Value | Description | Remarks |
|---|---|---|
| 0 | No Request | |
| 2 | R | Shift to R range |
| 4 | D | Shift to D range |
| other | Reserved | |

Remarks

Available only when Vehicle mode state="Autonomous Mode."

Available only when a vehicle is stationary (Traveling direction="standstill").

Available only when brake is applied.

3.2.2.2. Immobilization Command

Request for turning on/off WheelLock

Values

The following table shows a case where EPB and Shift P are used for immobilization.

| Value | Description | Remarks |
|---|---|---|
| 0 | No Request | |
| 1 | Applied | EPB is turned on and shift position is changed to "P" |
| 2 | Released | EPB is turned off and shift position is changed to the value of Propulsion Direction Command |

Remarks

This API is used for parking a vehicle.

Available only when Vehicle mode state="Autonomous Mode."

Changeable only when the vehicle is stationary (Traveling direction, "standstill").

Changeable only while brake is applied.

3.2.2.3. Standstill Command

Request for applying/releasing brake holding function

Values

| Value | Description | Remarks |
|---|---|---|
| 0 | No Request | |
| 1 | Applied | Brake holding function is allowed. |
| 2 | Released | |

Remarks

This API is used for choosing a status of whether the brake holding function is allowed.

Available only when Vehicle mode state="Autonomous Mode."

Acceleration Command (deceleration request) has to be continued until Standstill Status becomes "Applied".

3.2.2.4. Acceleration Command

Request for acceleration

Values

Estimated maximum deceleration to Estimated maximum acceleration [m/s$^2$]

Remarks

Available only when Vehicle mode state="Autonomous Mode."

Acceleration (+) and deceleration (−) request based on Propulsion Direction Status direction.

The upper/lower limit will vary based on Estimated maximum deceleration and Estimated maximum acceleration.

When acceleration more than Estimated maximum acceleration is requested, the request is set to Estimated maximum acceleration.

When deceleration more than Estimated maximum deceleration is requested, the request is set to Estimated maximum deceleration.

In case where a driver operates a vehicle (over-ride), the requested acceleration may not be achieved.

When PCS simultaneously works, VP should choose minimum acceleration (maximum deceleration).

3.2.2.5. Front Wheel Steer Angle Command

Values

| Value | Description | Remarks |
|---|---|---|
| — | [unit: rad] | |

Remarks

Available only when Vehicle mode state="Autonomous Mode"

Left is positive value (+). Right is negative value (–).

Front wheel steer angle is set to value (0) when the vehicle is going straight.

This request is set as a relative value from the current one to prevent misalignment of "Front Wheel Steer Angle" from being accumulated.

The request value should be set within Front wheel steer angle rate limitation.

In case where a driver operates a vehicle (over-ride), the requested Front Wheel Steer Angle may not be achieved.

3.2.2.6. Vehicle Mode Command

Request for changing from/to manual mode to/from Autonomous Mode

Values

| Value | Description | Remarks |
|---|---|---|
| 0 | No Request | |
| 1 | Request For Autonomy | |
| 2 | Deactivation Request | means transition request to manual mode |

Remarks

N/A

3.2.2.7. High Dynamics Command

If ADK would like to increase braking response performance* of VP, High

Dynamics Command should be set to "High".

Reaction time in VP upon a request from ADK

Values

| Value | Description | Remarks |
|---|---|---|
| 0 | No Request | |
| 1 | High | |
| 2-3 | Reserved | |

Remarks

N/A

3.2.2.8. Propulsion Direction Status

Current shift Status

Values

| Value | Description | Remarks |
|---|---|---|
| 0 | Reserved | |
| 1 | P | |
| 2 | R | |
| 3 | N | |
| 4 | D | |
| 5 | Reserved | |
| 6 | Invalid value | |

Remarks

If VP does not know the current shift status, this output is set to "Invalid Value."

3.2.2.9. Immobilization Status

Each immobilization system status

Values

The following table shows a case where EPB and Shift P are used for immobilization.

| Shift | EPB | Description | Remarks |
|---|---|---|---|
| 0 | 0 | Shift set to other than P, and EPB Released | |
| 1 | 0 | Shift set to P and EPB Released | |
| 0 | 1 | Shift set to other than P, and EPB applied | |
| 1 | 1 | Shift set to P and EPB Applied | |

Remarks

N/A

3.2.2.10. Standstill Status

Status of Standstill

Values

| Value | Description | Remarks |
|---|---|---|
| 0 | Released | |
| 1 | Applied | |
| 2 | Reserved | |
| 3 | Invalid value | |

Remarks

N/A

3.2.2.11. Estimated Gliding Acceleration

Acceleration calculated in VP in case that throttle is closed, considering slope, road load and etc.

Values

[unit: m/s$^2$]

Remarks

When the Propulsion Direction Status is "D", acceleration for forward direction shows a positive value.

When the Propulsion Direction Status is "R", acceleration for reverse direction shows a positive value.

3.2.2.12. Estimated Maximum Acceleration

Acceleration calculated in VP in case that throttle is fully open, considering slope, road load and etc.

Values

[unit: m/s$^2$]

Remarks

When the Propulsion Direction Status is "D", acceleration for forward direction shows a positive value.

When the Propulsion Direction Status is "R", acceleration for reverse direction shows a positive value.

3.2.2.13. Estimated Maximum Deceleration

Maximum deceleration calculated in VP in case that brake in VP is requested as maximum, considering slope, road load and etc.

Values

[unit: m/s$^2$]

Remarks

When the Propulsion Direction Status is "D", deceleration for forward direction shows a negative value.

When the Propulsion Direction Status is "R", deceleration for reverse direction shows a negative value.

3.2.2.14. Front wheel steer angle

Values

| Value | Description | Remarks |
|---|---|---|
| Minimum Value | Invalid value | |
| others | [unit: rad] | |

Remarks

Left is positive value (+). Right is negative value (–).

This signal should show invalid value until VP can calculate correct value or when the sensor is invalid/failed.

3.2.2.15. Front wheel steer angle rate

Front wheel steer angle rate

Values

| Value | Description | Remarks |
|---|---|---|
| Minimum Value others | Invalid value [unit: rad/s] | |

Remarks

Left is positive value (+). Right is negative value (−).

This signal should show invalid value until VP can calculate correct value or when Front wheel steer angle shows the minimum value.

3.2.2.16. Front wheel steer angle rate limitation

The limit of the Front wheel steer angle rate

Values

[unit: rad/s]

Remarks

Figure 14:
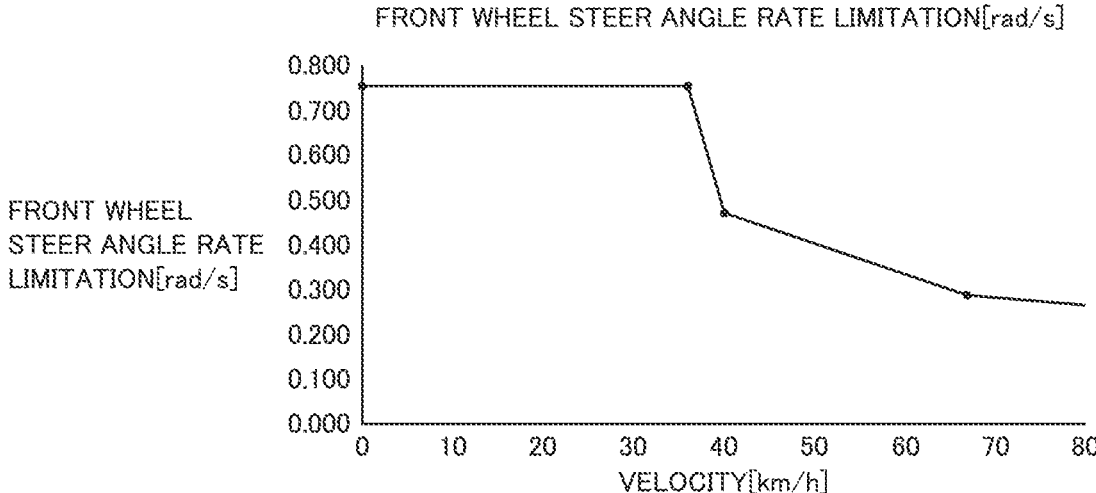
FIG. 14 is a diagram showing relation between a front wheel steer angle rate limitation and a velocity.

The limitation is calculated from the "vehicle speed—steering angle rate" map as shown in following Table 5 and FIG. 14.

A) At a low speed or stopped situation, use fixed value (0.751 [rad/s]).

B) At a higher speed, the steering angle rate is calculated from the vehicle speed using 3.432 m/s$^3$.

TABLE 5

| "vehicle speed - steering angle rate" map | | | | |
|---|---|---|---|---|
| | Velocity [km/h] | | | |
| | 0.0 | 36.0 | 40.0 | 67.0 | 84.0 |
| Front Wheel Steer Angle Rate Limitation [rad/s] | 0.751 | 0.751 | 0.469 | 0.287 | 0.253 |

3.2.2.17. Estimated maximum lateral acceleration

Values

[unit: m/s$^2$] (fixed value: 3.432)

Remarks

Maximum lateral acceleration defined for VP.

3.2.2.18. Estimated maximum lateral acceleration rate

Values

[unit: m/s$^3$] (fixed value: 3.432)

Remarks

Maximum lateral acceleration rate defined for VP.

3.2.2.19. Intervention of accelerator pedal

This signal shows whether the accelerator pedal is depressed by a driver (intervention).

Values

| Value | Description | Remarks |
|---|---|---|
| 0 | Not depressed | |
| 1 | depressed | |
| 2 | Beyond autonomy acceleration | |

Remarks

When a position of accelerator pedal is higher than a defined threshold, this signal is set to "depressed".

When the requested acceleration calculated from a position of accelerator pedal is higher than the requested acceleration from ADS, this signal is set as "Beyond autonomy acceleration."

3.2.2.20. Intervention of brake pedal

This signal shows whether the brake pedal is depressed by a driver (intervention).

Values

| Value | Description | Remarks |
|---|---|---|
| 0 | Not depressed | |
| 1 | depressed | |
| 2 | Beyond autonomy deceleration | |

Remarks

When a position of brake pedal is higher than the defined threshold value, this signal is set to "depressed".

When the requested deceleration calculated from a position of brake pedal is higher than the requested deceleration from ADS, this signal is set as "Beyond autonomy deceleration".

3.2.2.21. Intervention of steering wheel

This signal shows whether the steering wheel is operated by a driver (intervention).

Values

| Value | Description | Remarks |
|---|---|---|
| 0 | Not turned | |
| 1 | ADS and driver collaboratively work | |
| 2 | Only by human driver | |

Remarks

In "Intervention of steering wheel=1", considering the human driver's intent, EPS system drives the steering with the Human driver collaboratively.

In "Intervention of steering wheel=2", considering the human driver's intent, the steering request from ADS is not achieved. (The steering will be driven by human driver.)

3.2.2.22. Intervention of shift lever

This signal shows whether the shift lever is controlled by a driver (intervention)

Values

| Value | Description | Remarks |
|---|---|---|
| 0 | OFF | |
| 1 | ON | Controlled (moved to any shift position) |

Remarks

N/A 3.2.2.23. Wheel speed pulse (front left), Wheel speed pulse (front right), Wheel speed pulse (rear left), Wheel speed pulse (rear right)

Values

| Value | Description | Remarks |
|---|---|---|
| Maximum Value in transmission bits | Invalid value | The sensor is invalid. |
| others | ticks [unit: —] | The number of pulses per one round wheel depends on VP. |

Remarks

A pulse value is integrated at the pulse falling timing.

This wheel speed sensor outputs 96 pulses with a single rotation.

Regardless of invalid/failure of wheel speed sensor, wheel speed pulse will be updated.

When "1" is subtracted from a pulse value which shows "0", the value changes to "0xFF". When "1" is added to a pulse value which shows "0xFF", the value changes to "0".

Until the rotation direction is determined just after ECU is activated, a pulse value will be added as the rotation direction is "Forward".

When detected forward rotation, a pulse value will be added.

When detected reverse rotation, a pulse value will be subtracted.

3.2.2.24. Wheel rotation direction (front left), Wheel rotation direction (front right), Wheel rotation direction (Rear left), Wheel rotation direction (Rear right)

Values

| Value | Description | Remarks |
|---|---|---|
| 0 | Forward | |
| 1 | Reverse | |
| 2 | Reserved | |
| 3 | Invalid value | The sensor is invalid. |

Remarks

"Forward" is set until the rotation direction is determined after VP is turned on.

3.2.2.25. Traveling direction

Moving direction of vehicle

Values

| Value | Description | Remarks |
|---|---|---|
| 0 | Forward | |
| 1 | Reverse | |
| 2 | Standstill | |
| 3 | Undefined | |

Remarks

This signal shows "Standstill" when four wheel speed values are "0" during a constant time.

When shift is changed right after vehicle starts, it is possible to be

"Undefined".

3.2.2.26. Vehicle velocity

Estimated longitudinal velocity of vehicle

Values

| Value | Description | Remarks |
|---|---|---|
| Maximum Value in transmission bits | Invalid value | The sensor is invalid. |
| others | Velocity [unit: m/s] | |

Remarks

The value of this signal is a positive value when both forward direction and reverse direction.

3.2.2.27. Longitudinal acceleration

Estimated longitudinal acceleration of vehicle

Values

| Value | Description | Remarks |
|---|---|---|
| Minimum Value in transmission bits | Invalid value | The sensor is invalid. |
| others | Acceleration [unit: $m/s^2$] | |

Remarks

Acceleration (+) and deceleration (−) value based on Propulsion Direction Status direction.

3.2.2.28. Lateral acceleration lateral acceleration of vehicle

Values

| Value | Description | Remarks |
|---|---|---|
| Minimum Value in transmission bits | Invalid value | The sensor is invalid. |
| others | Acceleration [unit: $m/s^2$] | |

Remarks

A positive value shows counterclockwise. A negative value shows clockwise.

3.2.2.29. Yaw rate

Sensor value of yaw rate

Values

| Value | Description | Remarks |
|---|---|---|
| Minimum Value in transmission bits | Invalid value | The sensor is invalid. |
| others | Yaw rate [unit: deg/s] | |

Remarks

A positive value shows counterclockwise. A negative value shows clockwise.

3.2.2.30. Slipping Detection

Detection of tire glide/spin/skid

Values

| Value | Description | Remarks |
|---|---|---|
| 0 | Not Slipping | |
| 1 | Slipping | |
| 2 | Reserved | |
| 3 | Invalid value | |

Remarks

This signal is determined as "Slipping" when any of the following systems has been activated.

ABS (Anti-lock Braking System)

TRC (TRaction Control)

VSC (Vehicle Stability Control)

VDIM (Vehicle Dynamics Integrated Management)

3.2.2.31. Vehicle mode state

Autonomous or manual mode

Values

| Value | Description | Remarks |
|---|---|---|
| 0 | Manual Mode | The mode starts from Manual mode. |
| 1 | Autonomous Mode | |

Remarks

The initial state is set to "Manual Mode."

3.2.2.32. Readiness for autonomization

This signal shows whether a vehicle can change to Autonomous Mode or not

Values

| Value | Description | Remarks |
|---|---|---|
| 0 | Not Ready For Autonomous Mode | |
| 1 | Ready For Autonomous Mode | |
| 3 | Invalid | The status is not determined yet. |

Remarks

N/A 3.2.2.33. Failure status of VP functions for Autonomous Mode

This signal is used to show whether VP functions have some failures mode when a vehicle works as Autonomous Mode.

Values

| Value | Description | Remarks |
|---|---|---|
| 0 | No fault | |
| 1 | Fault | |
| 3 | Invalid | The status is not determined yet. |

Remarks

N/A 3.2.2.34. PCS Alert Status

Values

| Value | Description | Remarks |
|---|---|---|
| 0 | Normal | |
| 1 | Alert | Request alert from PCS system |
| 3 | Unavailable | |

-continued

| Value | Description | Remarks |
|---|---|---|

Remarks

N/A 3.2.2.35. PCS Preparation Status

Prefill Status as the preparation of PCS Brake

Values

| Value | Description | Remarks |
|---|---|---|
| 0 | Normal | |
| 1 | Active | |
| 3 | Unavailable | |

Remarks

"Active" is a status in which PCS prepares brake actuator to shorten the latency from a deceleration request issued by PCS.

When a value turns to "Active" during Vehicle mode state="Autonomous Mode," "ADS/PCS arbitration status" shows "ADS".

3.2.2.36. PCS Brake/PCS Brake Hold Status

Values

| Value | Description | Remarks |
|---|---|---|
| 0 | Normal | |
| 1 | PCS Brake | |
| 2 | PCS Brake Hold | |
| 7 | Unavailable | |

Remarks

N/A 3.2.2.37. ADS/PCS arbitration status

Arbitration status

Values

| Value | Description | Remarks |
|---|---|---|
| 0 | No Request | |
| 1 | ADS | ADS |
| 2 | PCS | PCS Brake or PCS Brake Hold |
| 3 | Invalid value | |

Remarks

When acceleration requested by PCS system in VP is smaller than one requested by ADS, the status is set as "PCS".

When acceleration requested by PCS system in VP is larger than one requested by ADS, the status is set as "ADS".

3.3. APIs for BODY control 3.3.1. API List for BODY control 3.3.1.1. Inputs

TABLE 6

| Input APIs for BODY Control | | |
|---|---|---|
| Signal Name | Description | Redundancy |
| Turnsignal command | Command to control the turnsignallight mode of the vehicle platform | N/A |

TABLE 6-continued

| Input APIs for BODY Control | | |
| --- | --- | --- |
| Signal Name | Description | Redundancy |
| Headlight command | Command to control the headlight mode of the vehicle platform | N/A |
| Hazardlight command | Command to control the hazardlight mode of the vehicle platform | N/A |
| Horn pattern command | Command to control the pattern of horn ON-time and OFF-time per cycle of the vehicle platform | N/A |
| Horn cycle command | Command to control the number of horn ON/OFF cycles of the vehicle platform | N/A |
| Continuous horn command | Command to control of horn ON of the vehicle platform | N/A |
| Front windshield wiper command | Command to control the front windshield wiper of the vehicle platform | N/A |
| Rear windshield wiper command | Command to control the rear windshield wiper mode of the vehicle platform | N/A |
| HVAC (1st row) operation command | Command to start/stop 1st row air conditioning control | N/A |
| HVAC (2nd row) operation command | Command to start/stop 2nd row air conditioning control | N/A |
| Target temperature (1st left) command | Command to set the target temperature around front left area | N/A |
| Target temperature (1st right) command | Command to set the target temperature around front right area | N/A |
| Target temperature (2nd left) command | Command to set the target temperature around rear left area | N/A |
| Target temperature (2nd right) command | Command to set the target temperature around rear right area | N/A |
| HVAC fan (1st row) command | Command to set the fan level on the front AC | N/A |
| HVAC fan (2nd row) command | Command to set the fan level on the rear AC | N/A |
| Air outlet (1st row) command | Command to set the mode of 1st row air outlet | N/A |
| Air outlet (2nd row) command | Command to set the mode of 2nd row air outlet | N/A |
| Air recirculation command | Command to set the air recirculation mode | N/A |
| AC mode command | Command to set the AC mode | N/A |

3.3.1.2. Outputs

TABLE 7

| Output APIs for BODY Control | | |
| --- | --- | --- |
| Signal Name | Description | Redundancy |
| Turnsignal status | Status of the current turnsignallight mode of the vehicle platform | N/A |
| Headlight status | Status of the current headlight mode of the vehicle platform | N/A |
| Hazardlight status | Status of the current hazardlight mode of the vehicle platform | N/A |
| Horn status | Status of the current horn of the vehicle platform | N/A |
| Front windshield wiper status | Status of the current front windshield wiper mode of the vehicle platform | N/A |
| Rear windshield wiper status | Status of the current rear windshield wiper mode of the vehicle platform | N/A |
| HVAC (1st row) status | Status of activation of the $1^{st}$ row HVAC | N/A |
| HVAC (2nd row) status | Status of activation of the $2^{nd}$ row HVAC | N/A |
| Target temperature (1st left) status | Status of set temperature of $1^{st}$ row left | N/A |
| Target temperature (1st right) status | Status of set temperature of $1^{st}$ row right | N/A |
| Target temperature (2nd left) status | Status of set temperature of $2^{nd}$ row left | N/A |
| Target temperature (2nd right) status | Status of set temperature of $2^{nd}$ row right | N/A |
| HVAC fan (1st row) status | Status of set fan level of $1^{st}$ row | N/A |
| HVAC fan (2nd row) status | Status of set fan level of $2^{nd}$ row | N/A |
| Air outlet (1st row) status | Status of mode of 1st row air outlet | N/A |
| Air outlet (2nd row) status | Status of mode of 2nd row air outlet | N/A |
| Air recirculation status | Status of set air recirculation mode | N/A |
| AC mode status | Status of set AC mode | N/A |
| Seat occupancy (1st right) status | Seat occupancy status in 1st right seat | N/A |
| Seat belt (1st left) status | Status of driver's seat belt buckle switch | N/A |

TABLE 7-continued

| Output APIs for BODY Control | | |
|---|---|---|
| Signal Name | Description | Redundancy |
| Seat belt (1st right) status | Status of passenger's seat belt buckle switch | N/A |
| Seat belt (2nd left) status | Seat belt buckle switch status in 2nd left seat | N/A |
| Seat belt (2nd right) status | Seat belt buckle switch status in 2nd right seat | N/A |
| Seat belt (3rd left) status | Seat belt buckle switch status in 3rd left seat | N/A |
| Seat belt (3rd center) status | Seat belt buckle switch status in 3rd center seat | N/A |
| Seat belt (3rd right) status | Seat belt buckle switch status in 3rd right seat | N/A |

3.3.2. Details of Each API for BODY Control 3.3.2.1. Turnsignal command

Request to control turn-signal

Values

| Value | Description | Remarks |
|---|---|---|
| 0 | OFF | |
| 1 | Right | Right blinker ON |
| 2 | Left | Left blinker ON |
| 3 | Reserved | |

Remarks

N/A 3.3.2.2. Headlight command

Request to control headlight

Values

| Value | Description | Remarks |
|---|---|---|
| 0 | No Request | Keep current mode |
| 1 | TAIL mode request | Side lamp mode |
| 2 | HEAD mode request | Lo mode |
| 3 | AUTO mode request | Auto mode |
| 4 | HI mode request | Hi mode |
| 5 | OFF Mode Request | |
| 6-7 | Reserved | |

Remarks

This command is valid when headlight mode on the combination switch="OFF" or "Auto mode=ON."

Driver operation overrides this command.

3.3.2.3. Hazardlight command

Request to control hazardlight

Values

| Value | Description | Remarks |
|---|---|---|
| 0 | No Request | |
| 1 | ON | |

Remarks

Driver operation overrides this command.

Hazardlight is ON while receiving "ON" command.

3.3.2.4. Horn pattern command

Request to choose a pattern of ON-time and OFF-time per cycle

Values

| Value | Description | Remarks |
|---|---|---|
| 0 | No request | |
| 1 | Pattern 1 | ON-time: 250 ms OFF-time: 750 ms |
| 2 | Pattern 2 | ON-time: 500 ms OFF-time: 500 ms |
| 3 | Pattern 3 | Reserved |
| 4 | Pattern 4 | Reserved |
| 5 | Pattern 5 | Reserved |
| 6 | Pattern 6 | Reserved |
| 7 | Pattern 7 | Reserved |

Remarks

N/A 3.3.2.5. Horn cycle command

Request to choose the number of ON and OFF cycles

Values 0 to 7 [−]

Remarks

N/A 3.3.2.6. Continuous horn command

Request to turn on/off horn

Values

| Value | Description | Remarks |
|---|---|---|
| 0 | No request | |
| 1 | ON | |

Remarks

This command's priority is higher than 3.3.2.4 Horn pattern and 3.3.2.5 Horn cycle command.

Horn is "ON" while receiving "ON" command.

3.3.2.7. Front windshield wiper command

Request to control front windshield wiper

Values

| Value | Description | Remarks |
|---|---|---|
| 0 | OFF mode request | |
| 1 | Lo mode request | |
| 2 | Hi mode request | |
| 3 | Intermittent mode request | |
| 4 | Auto mode request | |
| 5 | Mist mode request | One-time wiping |
| 6, 7 | Reserved | |

Remarks

This command is valid when front windshield wiper mode on a combination switch is "OFF" or "AUTO".

Driver input overrides this command.

Windshieldwiper mode is kept while receiving a command.

Wiping speed of intermittent mode is fixed.

3.3.2.8. Rear windshield wiper command

Request to control rear windshield wiper

Values

| Value | Description | Remarks |
|---|---|---|
| 0 | OFF mode request | |
| 1 | Lo mode request | |
| 2 | Reserved | |
| 3 | Intermittent mode request | |
| 4-7 | Reserved | |

Remarks

Driver input overrides this command

Windshieldwiper mode is kept while receiving a command.

Wiping speed of intermittent mode is fixed.

3.3.2.9. HVAC (1st row) operation command

Request to start/stop 1st row air conditioning control

Values

| Value | Description | Remarks |
|---|---|---|
| 0 | No request | |
| 1 | ON | |
| 2 | OFF | |

Remarks

N/A 3.3.2.10. HVAC (2nd row) operation command

Request to start/stop 2nd row air conditioning control

Values

| Value | Description | Remarks |
|---|---|---|
| 0 | No request | |
| 1 | ON | |
| 2 | OFF | |

Remarks

N/A 3.3.2.11. Target temperature (1st left) command

Request to set target temperature in front left area

Values

| Value | Description | Remarks |
|---|---|---|
| 0 | No request | |
| 60 to 85 [unit: $°$ F.] (by $1.0°$ F.) | Target temperature | |

Remarks

In case $°$ C. is used in VP, value should be set as $°$ C.

3.3.2.12. Target temperature (1st right) command

Request to set target temperature in front right area

Values

| Value | Description | Remarks |
|---|---|---|
| 0 | No request | |
| 60 to 85 [unit: $°$ F.] (by $1.0°$ F.) | Target temperature | |

Remarks

In case $°$ C. is used in VP, value should be set as $°$ C.

3.3.2.13. Target temperature (2nd left) command

Request to set target temperature in rear left area

Values

| Value | Description | Remarks |
|---|---|---|
| 0 | No request | |
| 60 to 85 [unit: $°$ F.] (by $1.0°$ F.) | Target temperature | |

Remarks

In case $°$ C. is used in VP, value should be set as $°$ C.

3.3.2.14. Target temperature (2nd right) command

Request to set target temperature in rear right area

Values

| Value | Description | Remarks |
|---|---|---|
| 0 | No request | |
| 60 to 85 [unit: $°$ F.] (by $1.0°$ F.) | Target temperature | |

Remarks

In case $°$ C. is used in VP, value should be set as $°$ C.

3.3.2.15. HVAC fan (1st row) command

Request to set fan level of front AC

Values

| Value | Description | Remarks |
|---|---|---|
| 0 | No request | |
| 1 to 7 (Maximum) | Fan level | |

Remarks

If you would like to turn the fan level to 0 (OFF), you should transmit "HVAC (1st row) operation command=OFF."

If you would like to turn the fan level to AUTO, you should transmit "HVAC (1st row) operation command=ON."

3.3.2.16. HVAC fan (2nd row) command

Request to set fan level of rear AC

Values

| Value | Description | Remarks |
|---|---|---|
| 0 | No request | |
| 1 to 7 (Maximum) | Fan level | |

Remarks

If you would like to turn the fan level to 0 (OFF), you should transmit "HVAC (2nd row) operation command=OFF."

If you would like to turn the fan level to AUTO, you should transmit "HVAC (2nd row) operation command=ON."

3.3.2.17. Air outlet (1st row) command
Request to set 1st row air outlet mode
Values

| Value | Description | Remarks |
|---|---|---|
| 0 | No Operation | |
| 1 | UPPER | Air flows to upper body |
| 2 | U/F | Air flows to upper body and feet |
| 3 | FEET | Air flows to feet |
| 4 | F/D | Air flows to feet and windshield defogger |

Remarks
N/A 3.3.2.18. Air outlet (2nd row) command
Request to set 2nd row air outlet mode
Values

| Value | Description | Remarks |
|---|---|---|
| 0 | No Operation | |
| 1 | UPPER | Air flows to upper body |
| 2 | U/F | Air flows to the upper body and feet |
| 3 | FEET | Air flows to feet. |

Remarks
N/A 3.3.2.19. Air recirculation command
Request to set air recirculation mode
Values

| Value | Description | Remarks |
|---|---|---|
| 0 | No request | |
| 1 | ON | |
| 2 | OFF | |

Remarks
N/A 3.3.2.20. AC mode command
Request to set AC mode
Values

| Value | Description | Remarks |
|---|---|---|
| 0 | No request | |
| 1 | ON | |
| 2 | OFF | |

Remarks
N/A 3.3.2.21. Turnsignal status
Values

| Value | Description | Remarks |
|---|---|---|
| 0 | OFF | |
| 1 | Left | |
| 2 | Right | |
| 3 | Invalid | |

Remarks
N/A 3.3.2.22. Headlight status
Values

| Value | Description | Remarks |
|---|---|---|
| 0 | OFF | |
| 1 | TAIL | |
| 2 | Lo | |
| 3 | Reserved | |
| 4 | Hi | |
| 5-6 | Reserved | |
| 7 | Invalid | |

Remarks
N/A 3.3.2.23. Hazardlight status
Values

| Value | Description | Remarks |
|---|---|---|
| 0 | OFF | |
| 1 | Hazard | |
| 2 | Reserved | |
| 3 | Invalid | |

Remarks
N/A 3.3.2.24. Horn status
Values

| Value | Description | Remarks |
|---|---|---|
| 0 | OFF | |
| 1 | ON | |
| 2 | Reserved | |
| 3 | Invalid | |

Remarks
In the case that 3.3.2.4 the Horn Pattern Command is active, the Horn status is "1" even if there are OFF periods in some patterns.

3.3.2.25. Front windshield wiper status

| Value | Description | Remarks |
|---|---|---|
| 0 | OFF | |
| 1 | Lo | |
| 2 | Hi | |
| 3 | INT | |
| 4-5 | Reserved | |
| 6 | Fail | |
| 7 | Invalid | |

Remarks
N/A 3.3.2.26. Rear windshield wiper status
Values

| Value | Description | Remarks |
|---|---|---|
| 0 | OFF | |
| 1 | Lo | |
| 2 | Reserved | |

-continued

| Value | Description | Remarks |
|-------|-------------|---------|
| 3 | INT | |
| 4-5 | Reserved | |
| 6 | Fail | |
| 7 | Invalid | |

Remarks

N/A 3.3.2.27. HVAC (1st row) status

| Value | Description | Remarks |
|-------|-------------|---------|
| 0 | OFF | |
| 1 | ON | |

Remarks

N/A 3.3.2.28. HVAC (2nd row) status

Values

| Value | Description | Remarks |
|-------|-------------|---------|
| 0 | OFF | |
| 1 | ON | |

Remarks

N/A 3.3.2.29. Target Temperature (1st left) status

Values

| Value | Description | Remarks |
|-------|-------------|---------|
| 0 | Lo | Max cold |
| 60 to 85 [unit: ° F.] | Target temperature | |
| 100 | Hi | Max hot |
| FFh | Unknown | |

Remarks

In case ° C. is used in VP, value should be set as ° C.

3.3.2.30. Target Temperature (1st right) status

Values

| Value | Description | Remarks |
|-------|-------------|---------|
| 0 | Lo | Max cold |
| 60 to 85 [unit: ° F.] | Target temperature | |
| 100 | Hi | Max hot |
| FFh | Unknown | |

Remarks

In case ° C. is used in VP, value should be set as ° C.

3.3.2.31. Target Temperature (2nd left) status

Values

| Value | Description | Remarks |
|-------|-------------|---------|
| 0 | Lo | Max cold |
| 60 to 85 [unit: ° F.] | Target temperature | |

-continued

| Value | Description | Remarks |
|-------|-------------|---------|
| 100 | Hi | Max hot |
| FFh | Unknown | |

Remarks

In case ° C. is used in VP, value should be set as ° C.

3.3.2.32. Target Temperature (2nd right) status

Values

| Value | Description | Remarks |
|-------|-------------|---------|
| 0 | Lo | Max cold |
| 60 to 85 [unit: ° F.] | Target temperature | |
| 100 | Hi | Max hot |
| FFh | Unknown | |

Remarks

In case ° C. is used in VP, value should be set as ° C.

3.3.2.33. HVAC fan (1st row) status

Values

| Value | Description | Remarks |
|-------|-------------|---------|
| 0 | OFF | |
| 1 to 7 | Fan Level | |
| 8 | Undefined | |

Remarks

N/A 3.3.2.34. HVAC fan (2nd row) status

Values

| Value | Description | Remarks |
|-------|-------------|---------|
| 0 | OFF | |
| 1 to 7 | Fan Level | |
| 8 | Undefined | |

Remarks

N/A 3.3.2.35. Air outlet (1st row) status

Values

| Value | Description | Remarks |
|-------|-------------|---------|
| 0 | ALL OFF | |
| 1 | UPPER | Air flows to upper body |
| 2 | U/F | Air flows to upper body and feet |
| 3 | FEET | Air flows to feet. |
| 4 | F/D | Air flows to feet and windshield defogger operates |
| 5 | DEF | Windshield defogger |
| 7 | Undefined | |

Remarks

N/A

3.3.2.36. Air outlet (2nd row) status

Values

| Value | Description | Remarks |
|---|---|---|
| 0 | ALL OFF | |
| 1 | UPPER | Air flows to upper body |
| 2 | U/F | Air flows to upper body and feet |
| 3 | FEET | Air flows to feet. |
| 7 | Undefined | |

Remarks

N/A

3.3.2.37. Air recirculation status

Values

| Value | Description | Remarks |
|---|---|---|
| 0 | OFF | |
| 1 | ON | |

Remarks

N/A

3.3.2.38. AC mode status

Values

| Value | Description | Remarks |
|---|---|---|
| 0 | OFF | |
| 1 | ON | |

Remarks

N/A

3.3.2.39. Seat occupancy (1st right) status

Values

| Value | Description | Remarks |
|---|---|---|
| 0 | Not occupied | |
| 1 | Occupied | |
| 2 | Undecided | In case of IG OFF or communication disruption to seat sensor |
| 3 | Failed | |

Remarks

When there is luggage on the seat, this signal may be set as "Occupied".

3.3.2.40. Seat belt (1st left) status

Values

| Value | Description | Remarks |
|---|---|---|
| 0 | Buckled | |
| 1 | Unbuckled | |
| 2 | Undetermined | In case where sensor does not work just after IG-ON |
| 3 | Fault of a switch | |

Remarks

N/A

3.3.2.41. Seat belt (1st right) status

Values

| Value | Description | Remarks |
|---|---|---|
| 0 | Buckled | |
| 1 | Unbuckled | |
| 2 | Undetermined | In case where sensor does not work just after IG-ON |
| 3 | Fault of a switch | |

Remarks

N/A

3.3.2.42. Seat belt (2nd left) status

Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks cannot detect sensor failure

3.3.2.43. Seat belt (2nd right) status

Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks cannot detect sensor failure

3.3.2.44. Seat belt (3rd left) status

Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks cannot detect sensor failure

3.3.2.45. Seat belt (3rd center) status

Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks
  cannot detect sensor failure
3.3.2.46. Seat belt (3rd right) status
Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks
  cannot detect sensor failure
3.4. APIs for Power control
3.4.1. API List for Power control
3.4.1.1. Inputs

TABLE 8

Input APIs for Power control

| Signal Name | Description | Redundancy |
|---|---|---|
| Power mode command | Command to control the power mode of VP | N/A |

3.4.1.2. Outputs

TABLE 9

Output APIs for Power control

| Signal Name | Description | Redundancy |
|---|---|---|
| Power mode status | Status of the current power mode of VP | N/A |

3.4.2. Details of each API for Power control
3.4.2.1. Power mode command
  Request to control power mode
Values

| Value | Description | Remarks |
|---|---|---|
| 0 | No request | |
| 1 | Sleep | Turns OFF the vehicle |
| 2 | Wake | Turns ON VCIB |
| 3 | Reserved | Reserved for data expansion |
| 4 | Reserved | Reserved for data expansion |
| 5 | Reserved | Reserved for data expansion |
| 6 | Drive | Turns ON the vehicle |

Figure 15:
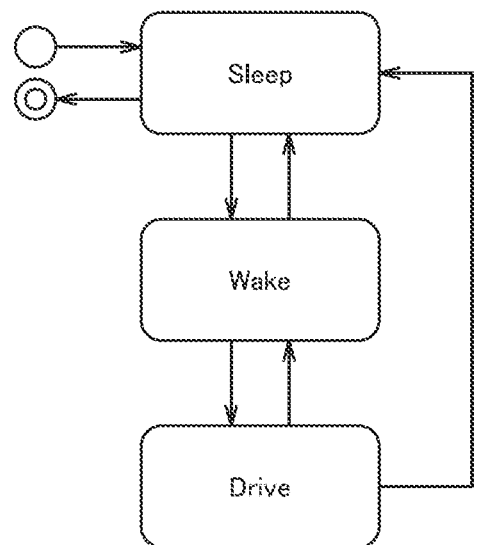
FIG. 15 is a state machine diagram of the power mode.

Remarks
  The state machine diagram of the power modes is shown in FIG. 15.
[Sleep]
  Vehicle power off condition. In this mode, the main battery does not supply power to each system, and neither VCIB nor other VP ECUs are activated.
[Wake]
  VCIB is awake by the auxiliary battery. In this mode, ECUs other than VCIB are not awake except for some of the body electrical ECUs.
[Driving Mode]
  Vehicle power on condition. In this mode, the main battery supplies power to the whole VP and all the VP ECUs including VCIB are awake.

3.4.2.2. Power mode status
Values

| Value | Description | Remarks |
|---|---|---|
| 0 | Reserved | |
| 1 | Sleep | |
| 2 | Wake | |
| 3 | Reserved | |
| 4 | Reserved | |
| 5 | Reserved | |
| 6 | Drive | |
| 7 | Unknown | means unhealthy situation would occur |

Remarks
  VCIB will transmit [Sleep] as Power_Mode_Status continuously for 3000 [ms] after executing the sleep sequence. And then, VCIB will shut down.
  ADS should stop transmitting signals to VCIB while VCIB is transmitting [Sleep].
3.5. APIs for Failure Notification
3.5.1. API List for Failure Notification
3.5.1.1. Inputs

TABLE 10

Input APIs for Failure Notification

| Signal Name | Description | Redundancy |
|---|---|---|
| N/A | N/A | N/A |

3.5.1.2. Outputs

TABLE 11

Output APIs for Failure Notification

| Signal Name | Description | Redundancy |
|---|---|---|
| Request for ADS operation | | Applied |
| Impact detection signal | | N/A |
| Performance deterioration of brake system | | Applied |
| Performance deterioration of propulsion system | | N/A |
| Performance deterioration of shift control system | | N/A |
| Performance deterioration of immobilization system | | Applied |
| Performance deterioration of steering system | | Applied |
| Performance deterioration of power supply system | | Applied |
| Performance deterioration of communication system | | Applied |

3.5.2. Details of each API for Failure Notification
3.5.2.1. Request for ADS Operation
  Values

| Value | Description | Remarks |
|---|---|---|
| 0 | No request | |
| 1 | Need maintenance | |
| 2 | Need to be back to garage | |
| 3 | Need to stop immediately | |
| Others | Reserved | |

Remarks
  This signal shows a behavior which the ADS is expected to do according to a failure which happened in the VP.

3.5.2.2. Impact detection signal

| Value | Description | Remarks |
|---|---|---|
| 0 | Normal | |
| 5 | Crash detection with activated airbag | |
| 6 | Crash detection with shut off high voltage circuit | |
| 7 | Invalid value | |
| Others | Reserved | |

Remarks

When the event of crash detection is generated, the signal is transmitted 50 consecutive times every 100 [ms]. If the crash detection state changes before the signal transmission is completed, the high signal of priority is transmitted.

Priority: crash detection>normal

Transmits for 5 s regardless of ordinary response at crash, because the vehicle breakdown judgment system shall be sent a voltage OFF request for 5 s or less after crash in HV vehicle.

Transmission interval is 100 ms within fuel cutoff motion delay allowance time (1 s) so that data can be transmitted more than 5 times.

In this case, an instantaneous power interruption is taken into account.

3.5.2.3. Performance deterioration of brake system

Values

| Value | Description | Remarks |
|---|---|---|
| 0 | Normal | — |
| 1 | Deterioration detected | — |

Remarks

N/A 3.5.2.4. Performance deterioration of propulsion system

Values

| Value | Description | Remarks |
|---|---|---|
| 0 | Normal | — |
| 1 | Deterioration detected | — |

Remarks

N/A 3.5.2.5. Performance deterioration of shift control system

Values

| Value | Description | Remarks |
|---|---|---|
| 0 | Normal | — |
| 1 | Deterioration detected | — |

Remarks

N/A 3.5.2.6. Performance deterioration of immobilization system

Values

| Value | Description | Remarks |
|---|---|---|
| 0 | Normal | — |
| 1 | Deterioration detected | — |

Remarks

N/A 3.5.2.7. Performance deterioration of Steering system

Values

| Value | Description | Remarks |
|---|---|---|
| 0 | Normal | — |
| 1 | Deterioration detected | — |

Remarks

N/A 3.5.2.8. Performance deterioration of power supply system

Values

| Value | Description | Remarks |
|---|---|---|
| 0 | Normal | — |
| 1 | Deterioration detected | — |

Remarks

N/A 3.5.2.9. Performance deterioration of communication system

Values

| Value | Description | Remarks |
|---|---|---|
| 0 | Normal | — |
| 1 | Deterioration detected | — |

Remarks

N/A 3.6. APIs for Security 3.6.1. API List for Security 3.6.1.1. Inputs

TABLE 12

| | Input APIs for Security | |
|---|---|---|
| Signal Name | Description | Redundancy |
| Door Lock (front) command | Command to control both 1st doors lock | N/A |
| Door Lock (rear) command | Command to control both 2nd doors and trunk lock | N/A |
| Central door lock command | Command to control the all door lock | N/A |
| Device Authentication Signature the 1st word | This is the 8th byte from the 1st byte of the Signature value. | N/A |

TABLE 12-continued

| | Input APIs for Security | |
| --- | --- | --- |
| Signal Name | Description | Redun-dancy |
| Device Authentication Signature the 2nd word | This is the 16th byte from the 9th byte of the Signature value. | N/A |
| Device Authentication Signature the 3rd word | This is the 24th byte from the 17th byte of the Signature value. | N/A |
| Device Authentication Signature the 4th word | This is the 32th byte from the 25th byte of the Signature value. | N/A |

3.6.1.2. Outputs

TABLE 13

| | Output APIs for Security | |
| --- | --- | --- |
| Signal Name | Description | Redun-dancy |
| Door lock (1st left) status | Status of the current 1st-left door lock | N/A |
| Door lock (1st right) status | Status of the current 1st-right door lock | N/A |
| Door lock (2nd left) status | Status of the current 2nd-left door lock | N/A |
| Door lock (2nd right) status | Status of the current 2nd-right door lock | N/A |
| Trunk Lock status | Status of the current trunk (back door) lock | N/A |
| Central door lock status | Status of the current all door lock | N/A |
| Alarm system status | Status of the current vehicle alarm | N/A |
| Device Authentication Seed the 1st word | This is the 8th byte from the 1st byte of the Seed value. | N/A |
| Device Authentication Seed the 2nd word | This is the 16th byte from the 9th byte of the Seed value. | N/A |
| Trip Counter | This counter is incremented in units of trips by the Freshness Value management master ECU. | N/A |
| Reset Counter | This counter is incremented periodically by the Freshness Value management master ECU. | N/A |
| 1st Left Door Open Status | Status of the current 1st-left door open/close of the vehicle platform | N/A |
| 1st Right Door Open Status | Status of the current 1st-right door open/close of the vehicle platform | N/A |
| 2nd Left Door Open Status | Status of the current 2nd-left door open/close of the vehicle platform | N/A |
| 2nd Right Door Open Status | Status of the current 2nd-right door open/close of the vehicle platform | N/A |
| Trunk Status | Status of the current trunk door open of the vehicle platform | N/A |
| Hood Open Status | Status of the current hood open/close of the vehicle platform | N/A |

3.6.2. Details of Each API for Security
3.6.2.1. Door Lock (front) command, Door Lock (rear) command

| Value | Description | Remarks |
| --- | --- | --- |
| 0 | No Request | |
| 3 | Lock | Not supported in Toyota VP |
| 2 | Unlock | |
| 3 | Reserved | |

Remarks
    If ADK requests for unlocking front side, both front doors are unlocked.
    If ADK requests for unlocking rear side, both 2nd row and trunk doors are unlocked.
    If ADK requests for locking any door, it should use "Central door lock command."

(The functionality for individual locking is not supported in Toyota VP.)
3.6.2.2. Central door lock command
    Request to control all doors' lock
Values

| Value | Description | Remarks |
| --- | --- | --- |
| 0 | No Request | |
| 1 | Lock (all) | |
| 2 | Unlock (all) | |
| 3 | Reserved | |

Remarks
    N/A
3.6.2.3. Device Authentication Signature the 1st word, Device Authentication Signature the 2nd word, Device Authentication Signature the 3rd word, Device Authentication Signature the 4th word, Device Authentication Seed the 1st word, Device Authentication Seed the 2nd word
    Device Authentication Signature the 1st word is presented in from 1st to 8th bytes of the signature.
    Device Authentication Signature the 2nd word is presented in from 9th to 16th bytes of the signature.
    Device Authentication Signature the 3rd word is presented in from 17th to 24th bytes of the signature.
    Device Authentication Signature the 4th word is presented in from 25th to 32nd bytes of the signature.
    Device Authentication Seed the 1st word is presented in from 1st to 8th bytes of the seed.
    Device Authentication Seed the 2nd word is presented in from 9th to 16th bytes of the seed.
3.6.2.4. Door lock (1st left) status
Values

| Value | Description | Remarks |
| --- | --- | --- |
| 0 | Reserved | |
| 1 | Locked | |
| 2 | Unlocked | |
| 3 | Invalid | |

Remarks
    N/A
3.6.2.5. Door lock (1st right) status

| Value | Description | Remarks |
| --- | --- | --- |
| 0 | Reserved | |
| 1 | Locked | |
| 2 | Unlocked | |
| 3 | Invalid | |

Remarks
    N/A
3.6.2.6. Door lock (2nd left) status
Values

| Value | Description | Remarks |
| --- | --- | --- |
| 0 | Reserved | |
| 1 | Locked | |

-continued

| Value | Description | Remarks |
|-------|-------------|---------|
| 2 | Unlocked | |
| 3 | Invalid | |

Remarks
    N/A

3.6.2.7. Door lock (2nd right) status
Values

| Value | Description | Remarks |
|-------|-------------|---------|
| 0 | Reserved | |
| 1 | Locked | |
| 2 | Unlocked | |
| 3 | Invalid | |

Remarks
    N/A

3.6.2.8. Door lock status of all doors
Values

| Value | Description | Remarks |
|-------|-------------|---------|
| 0 | Reserved | |
| 1 | All Locked | |
| 2 | Anything Unlocked | |
| 3 | Invalid | |

Remarks
    In case any doors are unlocked, "Anything Unlocked."
    In case all doors are locked, "All Locked."

3.6.2.9. Alarm system status
Values

| Value | Description | Remarks |
|-------|-------------|---------|
| 0 | Disarmed | Alarm System is not activated. |
| 1 | Armed | Alarm System is activated without alarming. |
| 2 | Active | Alarm System is activated, and the alarm is beeping. |
| 3 | Invalid | |

Remarks
    N/A

3.6.2.9.1. Trip Counter
    This counter is incremented in a unit of trips by the Freshness Value management master ECU.
Values
    0-FFFFh
Remarks
    This value is used to create a Freshness value.
    For details, please refer to the other material [the specification of Toyota's MAC module].

3.6.2.9.2. Reset Counter
    This counter is incremented periodically by the Freshness Value management master ECU.
Values
    0-FFFFFh
Remarks
    This value is used to create a Freshness value.
    For details, please refer to the other material [the specification of Toyota's MAC module].

3.6.2.10. 1st Left Door Open Status
    Status of the current 1st-left door open/close of the vehicle platform
Values

| Value | Description | Remarks |
|-------|-------------|---------|
| 0 | Reserved | |
| 1 | Open | |
| 2 | Closes | |
| 3 | Invalid | |

Remarks
    N/A

3.6.2.11. 1st Right Door Open Status
    Status of the current 1st-right door open/close
Values

| Value | Description | Remarks |
|-------|-------------|---------|
| 0 | Reserved | |
| 1 | Open | |
| 2 | Close | |
| 3 | Invalid | |

Remarks
    N/A

3.6.2.12. 2nd Left Door Open Status
    Status of the current 2nd-left door open/close
Values

| Value | Description | Remarks |
|-------|-------------|---------|
| 0 | Reserved | |
| 1 | Open | |
| 2 | Close | |
| 3 | Invalid | |

Remarks
    N/A

3.6.2.13. 2nd Right Door Open Status
    Status of the current 2nd-right door open/close
Values

| Value | Description | Remarks |
|-------|-------------|---------|
| 0 | Reserved | |
| 1 | Open | |
| 2 | Close | |
| 3 | Invalid | |

Remarks
    N/A

3.6.2.14. Trunk Status
    Status of the current trunk door open/close
Values

| Value | Description | Remarks |
|-------|-------------|---------|
| 0 | Reserved | |
| 1 | Open | |
| 2 | Close | |
| 3 | Invalid | |

Remarks
  N/A
3.6.2.15. Hood Open Status
  Status of the current hood open/close
Values

| Value | Description | Remarks |
|---|---|---|
| 0 | Reserved | |
| 1 | Open | |
| 2 | Close | |
| 3 | Invalid | |

Remarks
  N/A
  4. API Guides to control Toyota Vehicles
  This section shows in detail the way of using APIs for Toyota vehicles.
  4.1. APIs for Vehicle Motion Control
  4.1.1. API List for Vehicle Motion Control
  Input and output APIs for vehicle motion control are shown in Table 14 and Table 15, respectively. Usage guides of some APIs are presented in the following sections as indicated in each table.
  4.1.1.1. Inputs

TABLE 14

| Input APIs for Vehicle Motion Control | | | |
|---|---|---|---|
| Signal Name | Description | Redundancy | Usage Guide |
| Propulsion Direction Command | Request for shift change from/to forward (D range) to/from back (R range) | N/A | 4.1.2.1 |
| Immobilization Command | Request for turning on/off WheelLock | Applied | 4.1.2.2 |
| Standstill Command | Request for keeping on/off stationary | Applied | 4.1.2.3 |
| Acceleration Command | Request for acceleration/deceleration | Applied | 4.1.2.1 4.1.2.2 4.1.2.3 4.1.2.4 |
| Front Wheel Steer Angle Command | Request for front wheel steer angle | Applied | 4.1.2.5 |
| Vehicle Mode Command | Request for changing from/to manual mode to/from Autonomous Mode | Applied | 4.1.2.6 |
| High Dynamics Command | Request for increasing braking response performance* | Applied | — |

*Reaction time in VP upon a request from ADK 4.1.1.2. Outputs

TABLE 15

| Output APIs for Vehicle Motion Control | | | |
|---|---|---|---|
| Signal Name | Description | Redundancy | Usage Guide |
| Propulsion Direction Status | Current shift status | N/A | — |
| Immobilization Status | Status of immobilization (e.g. EPB and Shift P) | Applied | 4.1.2.2 4.1.2.3 |
| Standstill Status | Standstill status | N/A | 4.1.2.3 |
| Estimated Gliding Acceleration | Estimated vehicle acceleration/deceleration when throttle is fully closed | N/A | — |
| Estimated maximum acceleration | Estimated maximum acceleration | Applied | — |
| Estimated maximum deceleration | Estimated maximum deceleration | Applied | — |
| Front wheel steer angle | Front wheel steer angle | Applied | 4.1.2.5 |
| Front wheel steer angle rate | Front wheel steer angle rate | Applied | — |
| Front wheel steer angle rate limitation | Road wheel angle rate limit | Applied | — |
| Estimated maximum lateral acceleration | Estimated max lateral acceleration | Applied | — |
| Estimated maximum lateral acceleration rate | Estimated max lateral acceleration rate | Applied | — |
| Intervention of accelerator pedal | This signal shows whether the accelerator pedal is depressed by a driver (intervention) | N/A | 4.1.2.4 |
| Intervention of brake pedal | This signal shows whether the brake pedal is depressed by a driver (intervention) | N/A | — |
| Intervention of steering wheel | This signal shows whether the steering wheel is turned by a driver (intervention) | N/A | 4.1.2.5 |
| Intervention of shift lever | This signal shows whether the shift lever is controlled by a driver (intervention) | N/A | — |
| Wheel speed pulse (front left) | Pulse from wheel speed sensor (Front Left Wheel) | N/A | — |
| Wheel rotation direction (front left) | Rotation direction of wheel (Front Left) | N/A | — |
| Wheel speed pulse (front right) | Pulse from wheel speed sensor (Front Right Wheel) | N/A | — |
| Wheel rotation direction (front right) | Rotation direction of wheel (Front Right) | N/A | — |
| Wheel speed pulse (rear left) | Pulse from wheel speed sensor (Rear Left Wheel) | Applied | — |
| Wheel rotation direction (Rear left) | Rotation direction of wheel (Rear Left) | Applied | — |

TABLE 15-continued

| Output APIs for Vehicle Motion Control | | | |
| --- | --- | --- | --- |
| Signal Name | Description | Redundancy | Usage Guide |
| Wheel speed pulse (roar right) | Pulse from wheel speed sensor (Rear Right Wheel) | Applied | — |
| Wheel rotation direction (Rear right) | Rotation direction of wheel (Rear Right) | Applied | — |
| Traveling direction | Moving direction of vehicle | Applied | 4.1.2.1 4.1.2.3 |
| Vehicle velocity | Estimated longitudinal velocity of vehicle | Applied | 4.1.2.2 |
| Longitudinal acceleration | Estimated longitudinal acceleration of vehicle | Applied | — |
| Lateral acceleration | Sensor value of lateral acceleration of vehicle | Applied | — |
| Yawrate | Sensor value of Yaw rate | Applied | — |
| Slipping Detection | Detection of tire glide/spin/skid | Applied | — |
| Vehicle mode state | State of whether Autonomous Mode, manual mode or others | Applied | 4.1.2.6 |
| Readiness for autonomization | Situation of whether the vehicle can transition to Autonomous Mode or not | Applied | 4.1.2.6 |
| Failure status of VP functions for Autonomous Mode | This signal is used to show whether VP functions have some failures mode when a vehicle works as Autonomous Mode. | Applied | — |
| PCS Alert Status | Status of PCS (Alert) | N/A | — |
| PCS Preparation Status | Status of PCS (Prefill) | N/A | — |
| PCS Brake/PCS Brake Hold Status | Status of PCS (PB/PBH) | N/A | — |
| ADS/PCS arbitration status | ADS/PCS arbitration status | N/A | — |

4.1.2. API guides in Details for Vehicle Motion Control 4.1.2.1. Propulsion Direction Command Please refer to 3.2.2.1 for value and remarks in detail.

Figure 16:
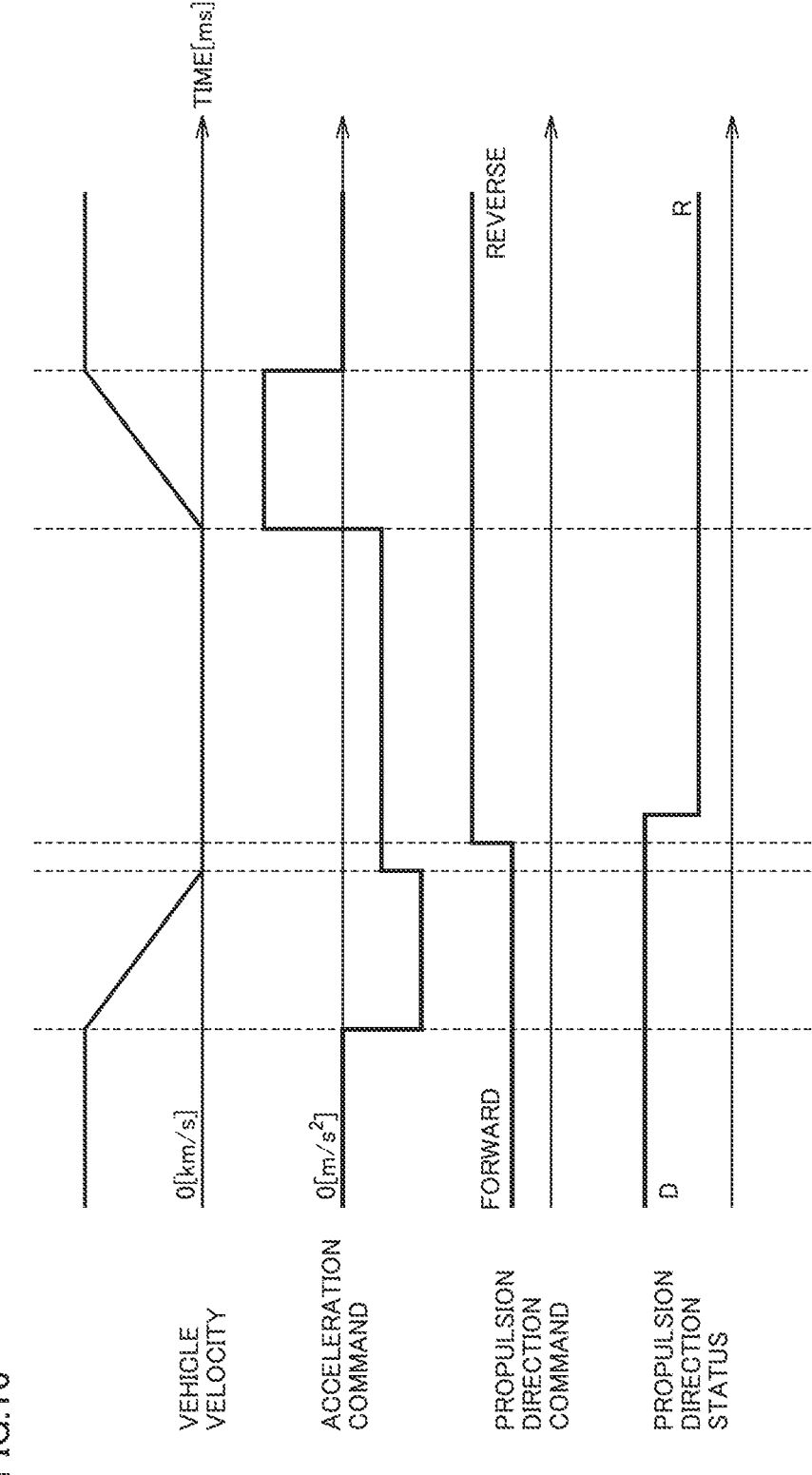
FIG. 16 is a diagram showing details of shift change sequences.

FIG. 16 shows shift change sequences in detail.

First deceleration is requested by Acceleration Command and the vehicle is stopped. When Traveling direction is set to "standstill", any shift position can be requested by Propulsion Direction Command. (In FIG. 16, "D" "R").

Deceleration has to be requested by Acceleration Command until completing shift change.

After shift position is changed, acceleration/deceleration can be chosen based on Acceleration Command.

While Vehicle mode state=Autonomous Mode, driver's shift lever operation is not accepted.

4.1.2.2. Immobilization Command

Please refer to 3.2.2.2 for value and remarks in detail.

Figure 17:
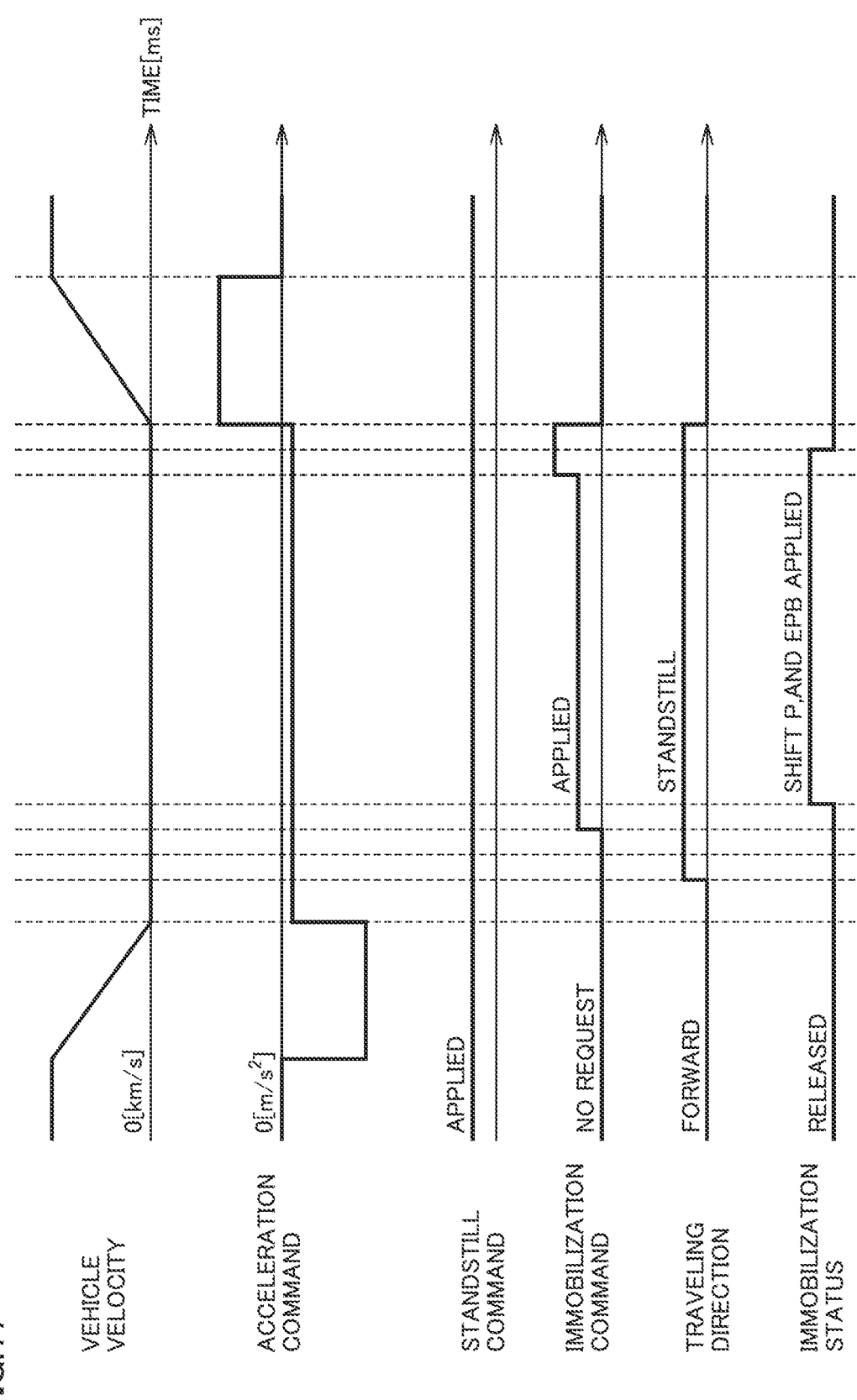
FIG. 17 is a diagram showing immobilization sequences.

FIG. 17 shows how to activate/deactivate immobilization function.

Deceleration is requested with Acceleration Command to make a vehicle stop. When Vehicle velocity goes to zero, Immobilization function is activated by Immobilization Command="Applied". Acceleration Command is set to Deceleration until Immobilization Status is set to "Applied".

When deactivating Immobilization function, Immobilization Command="Released" has to be requested and simultaneously Acceleration Command has to be set as deceleration until confirming Immobilization Status="Released".

After Immobilization function is deactivated, the vehicle can be accelerated/decelerated based on Acceleration Command.

4.1.2.3. Standstill Command

Please refer to 3.2.2.3 for value and remarks in detail.

In case where Standstill Command is set as "Applied", brakehold function can be ready to be used and brakehold function is activated in a condition where a vehicle stops and Acceleration Command is set as Deceleration (<0). And then Standstill Status is changed to "Applied". On the other hand, in case where Standstill Command is set as "Released", brakehold function is deactivated.

Figure 18:
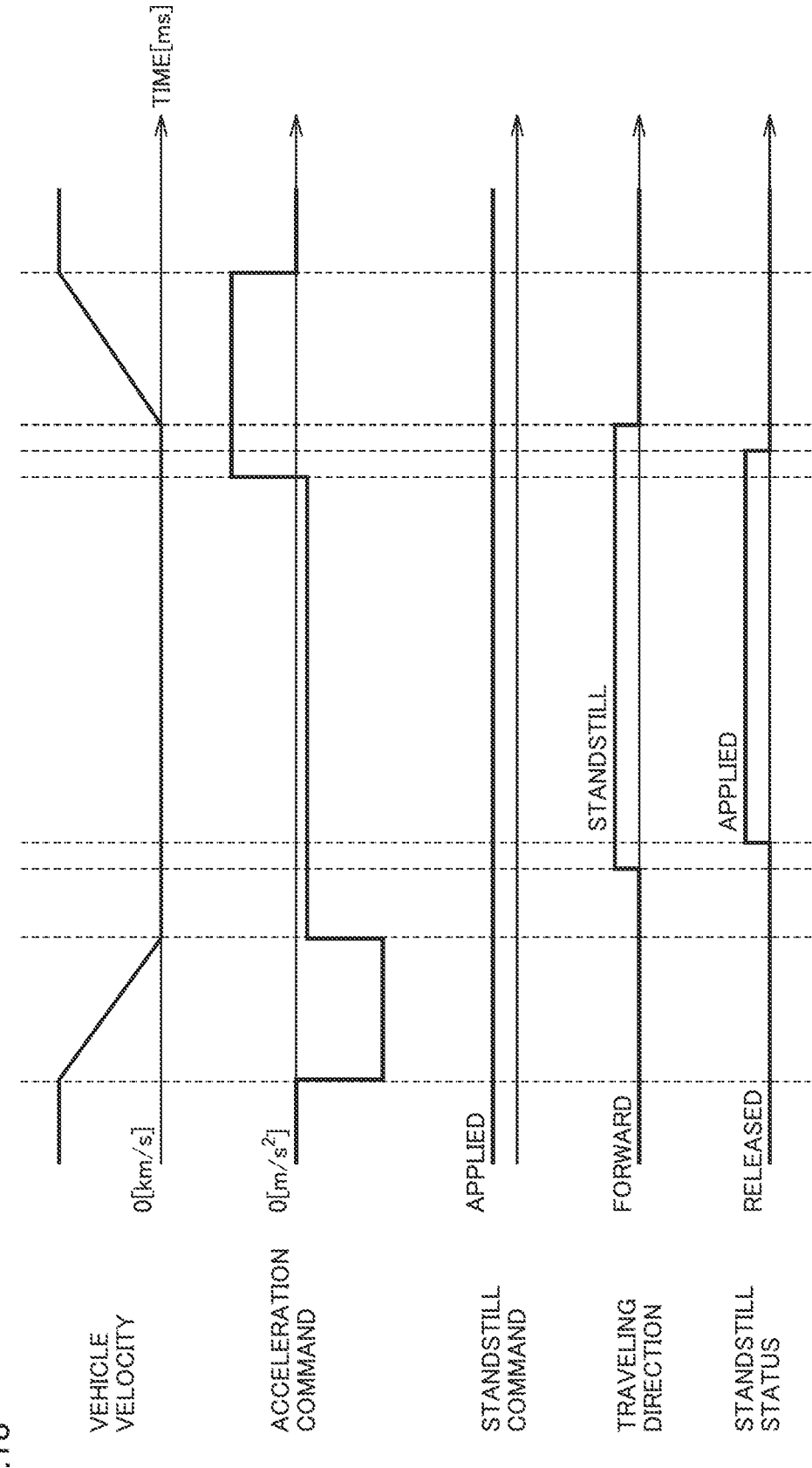
FIG. 18 is a diagram showing standstill sequences.

FIG. 18 shows standstill sequences.

To make a vehicle stop, deceleration is requested with Acceleration Command.

When the vehicle stops for a while, Traveling direction is changed to "standstill". Even during Standstill status="Applied", deceleration shall be requested with Acceleration Command.

If you want the vehicle to move forward, Acceleration Command is set as Acceleration (>0). Then brake hold function is released and the vehicle is accelerated.

4.1.2.4. Acceleration Command

Please refer to 3.2.2.4 for value and remarks in detail.

The below shows how a vehicle behaves when an acceleration pedal is operated.

In case where the accelerator pedal is operated, a maximum acceleration value of either 1) one calculated from accelerator pedal stroke or 2) Acceleration Command input from ADK is chosen. ADK can see which value is selected by checking Intervention of accelerator pedal.

The below shows how a vehicle behaves when a brake pedal is operated. Deceleration value in the vehicle is the sum of 1) one calculated from the brake pedal stroke and 2) one requested from ADK.

4.1.2.5. Front Wheel Steer Angle Command

Please refer to 3.2.2.5 for value and remarks in detail.

The below shows the way of using Front Wheel Steer Angle Command.

Front Wheel Steer Angle Command is set as a relative value from Front wheel steer angle.

For example, in case where Front wheel steer angle=0.1 [rad] and a vehicle goes straight;

If ADK would like to go straight, Front Wheel Steer Angle Command should be set to 0+0.1=0.1[rad].

If ADK requests to steer by −0.3 [rad], Front Wheel Steer Angle Command should be set to −0.3+0.1=−0.2 [rad].

The below shows how a vehicle behaves when a driver operates the steering.

A maximum value is selected either from 1) one calculated from steering wheel operation by the driver or 2) one requested by ADK.

Note that Front Wheel Steer Angle Command is not accepted if the driver strongly operates the steering wheel. This situation can be found by Intervention of steering wheel flag.

4.1.2.6. Vehicle Mode Command

Figure 19:
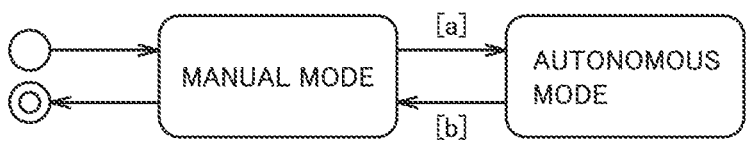
FIG. 19 is a state machine diagram of an autonomy state.

The state machine of mode transition for Autono-MaaS vehicle is shown in FIG. 19.

The explanation of each state is shown as follows.

| State | Description |
|---|---|
| Manual | A vehicle begins with this state and is under a control of a human driver. ADK cannot give any controls (except some commands) to VP. Power mode status and Vehicle mode state are in the followings: Power mode status = Wake or Drive Vehicle mode state = Manual Mode |
| Autonomy | ADK can communicate to VP after authentication is successful. VP is under the control of the ADK as a result of being issued "Request for Autonomy." Power mode status and Vehicle mode state are in the followings: Power mode status = Drive Vehicle mode state = Autonomous Mode |

The explanation of each transition is shown as follows.

| Transition | Conditions |
|---|---|
| a | When the following conditions are established, the mode will be transitioned from Manual to Autonomy: The ADK is authenticated, Power mode status = Drive, Readiness for autonomization = Ready For Autonomy Vehicle Mode Command = Request For Autonomy. |

-continued

| Transition | Conditions |
|---|---|
| b | When the following conditions are established, the mode will be transitioned from Autonomy to Manual: Vehicle Mode Command = Deactivation Request. |

4.2. APIs for BODY Control
4.2.1. API List for BODY Control
4.2.1.1. Inputs

TABLE 16

| Input APIs for BODY Control | | | |
|---|---|---|---|
| Signal Name | Description | Redundancy | Usage Guide |
| Turnsignal command | Command to control the turnsignallight mode of the vehicle platform | N/A | — |
| Headlight command | Command to control the headlight mode of the vehicle platform | N/A | — |
| Hazardlight command | Command to control the hazardlight mode of the vehicle platform | N/A | — |
| Horn pattern command | Command to control the pattern of horn ON-time and OFF-time per cycle of the vehicle platform | N/A | — |
| Horn cycle command | Command to control the number of horn ON/OFF cycles of the vehicle platform | N/A | — |
| Continuous horn command | Command to control of horn ON of the vehicle platform | N/A | — |
| Front windshield wiper command | Command to control the front windshield wiper of the vehicle platform | N/A | — |
| Rear windshield wiper command | Command to control the rear windshield wiper mode of the vehicle platform | N/A | — |
| HVAC (1st row) operation command | Command to start/stop 1st row air conditioning control | N/A | — |
| HVAC (2nd row) operation command | Command to start/stop 2nd row air conditioning control | N/A | — |
| Target temperature (1st left) command | Command to set the target temperature around front left area | N/A | — |
| Target temperature (1st right) command | Command to set the target temperature around front right area | N/A | — |
| Target temperature (2nd left) command | Command to set the target temperature around rear left area | N/A | — |
| Target temperature (2nd right) command | Command to set the target temperature around rear right area | N/A | — |
| HVAC fan (1st row) command | Command to set the fan level on the front AC | N/A | — |

TABLE 16-continued

| Input APIs for BODY Control | | | |
| --- | --- | --- | --- |
| Signal Name | Description | Redundancy | Usage Guide |
| HVAC fan (2nd row) command | Command to set the fan level on the rear AC | N/A | — |
| Air outlet (1st row) command | Command to set the mode of 1st row air outlet | N/A | — |
| Air outlet (2nd row) command | Command to set the mode of 2nd row air outlet | N/A | — |
| Air recirculation command | Command to set the air recirculation mode | N/A | — |
| AC mode command | Command to set the AC mode | N/A | — |

4.2.1.2. Outputs

TABLE 17

| Output APIs for BODY Control | | | |
| --- | --- | --- | --- |
| Signal Name | Description | Redundancy | Usage Guide |
| Turnsignal status | Status of the current turnsignallight mode of the vehicle platform | N/A | — |
| Headlight status | Status of the current headlight mode of the vehicle platform | N/A | — |
| Hazardlight status | Status of the current hazardlight mode of the vehicle platform | N/A | — |
| Horn status | Status of the current horn of the vehicle platform | N/A | — |
| Front windshield wiper status | Status of the current front windshield wiper mode of the vehicle platform | N/A | — |
| Rear windshield wiper status | Status of the current rear windshield wiper mode of the vehicle platform | N/A | — |
| HVAC (1st row) status | Status of activation of the $1^{st}$ row HVAC | N/A | — |
| HVAC (2nd row) status | Status of activation of the $2^{nd}$ row HVAC | N/A | — |
| Target temperature (1st left) status | Status of set temperature of $1^{st}$ row left | N/A | — |
| Target temperature (1st right) status | Status of set temperature of $1^{st}$ row right | N/A | — |
| Target temperature (2nd left) status | Status of set temperature of $2^{nd}$ row left | N/A | — |
| Target temperature (2nd right) status | Status of set temperature of $2^{nd}$ row right | N/A | — |
| HVAC fan (1st row) status | Status of set fan level of $1^{st}$ row | N/A | — |
| HVAC fan (2nd row) status | Status of set fan level of $2^{nd}$ row | N/A | — |
| Air outlet (1st row) status | Status of mode of 1st row air outlet | N/A | — |
| Air outlet (2nd row) status | Status of mode of 2nd row air outlet | N/A | — |
| Air recirculation status | Status of set air recirculation mode | N/A | — |
| AC mode status | Status of set AC mode | N/A | — |
| Seat occupancy (1st right) status | Seat occupancy status in 1st left seat | N/A | — |
| Seat belt (1st left) status | Status of driver's seat belt buckle switch | N/A | — |
| Seat belt (1st right) status | Status of passenger's seat belt buckle switch | N/A | — |
| Seat belt (2nd left) status | Seat belt buckle switch status in 2nd left seat | N/A | — |
| Seat belt (2nd right) status | Seat belt buckle switch status in 2nd right seat | N/A | — |

4.3. APIs for Power Control 4.3.1. API List for Power Control 4.3.1.1. Inputs

TABLE 18

| | Input APIs for Power Control | | |
| --- | --- | --- | --- |
| Signal Name | Description | Redundancy | Usage Guide |
| Power mode command | Command to control the power mode of VP | N/A | — |

4.3.1.2. Outputs

TABLE 19

| | Output APIs for Power Control | | |
| --- | --- | --- | --- |
| Signal Name | Description | Redundancy | Usage Guide |
| Power mode status | Status of the current power mode of VP | N/A | — |

4.4. APIs for Failure Notification 4.4.1. API List for Failure Notification 4.4.1.1. Inputs

TABLE 20

| | Input APIs for Failure Notification | | |
| --- | --- | --- | --- |
| Signal Name | Description | Redundancy | Usage guide |
| N/A | — | — | — |

4.4.1.2. Outputs

TABLE 21

| | Output APIs for Failure Notification | | |
| --- | --- | --- | --- |
| Signal Name | Description | Redundancy | Usage guide |
| Request for ADS Operation | — | Applied | — |
| Impact detection signal | — | N/A | — |
| Performance deterioration of Brake system | — | Applied | — |
| Performance deterioration of Propulsion System | — | N/A | — |
| Performance deterioration of Shift control system | — | N/A | — |
| Performance deterioration of Immobilization system | — | Applied | — |
| Performance deterioration of Steering system | | Applied | — |
| Performance deterioration of Power supply system | | Applied | — |
| Performance deterioration of Communication system | | Applied | — |

4.5. APIs for Security 4.5.1. API List for Security Input and output APIs for Security are shown in Table 22 and Table 23, respectively. Usage guides of some APIs are presented in the following sections as indicated in each table.

4.5.1.1. Inputs

TABLE 22

| | Input APIs for Security | | |
| --- | --- | --- | --- |
| Signal Name | Description | Redundancy | Usage Guide |
| Door Lock (front) command | Command to control 1st both doors lock | N/A | — |
| Door Lock (rear) command | Command to control 2nd both doors and trunk lock | N/A | — |
| Central door lock command | Command to control the all door lock | N/A | — |
| Device Authentication Signature the 1st word | This is the 8th byte from the 1st byte of the Signature value. | N/A | 4.5.2.1 |
| Device Authentication Signature the 2nd word | This is the 16th byte from the 9th byte of the Signature value. | N/A | 4.5.2.1 |
| Device Authentication Signature the 3rd word | This is the 24th byte from the 17th byte of the Signature value. | N/A | 4.5.2.1 |
| Device Authentication Signature the 4th word | This is the 32th byte from the 25th byte of the Signature value. | N/A | 4.5.2.1 |

4.5.1.2. Outputs

TABLE 23

Output APIs for Security

| Signal Name | Description | Redundancy | Usage Guide |
|---|---|---|---|
| Door lock (1st left) status | Status of the current 1st-left door lock | N/A | — |
| Door lock (1st right) status | Status of the current 1st-right door lock | N/A | — |
| Door lock (2nd left) status | Status of the current 2nd-left door lock | N/A | — |
| Door lock (2nd right) status | Status of the current 2nd-right door lock | N/A | — |
| Central door lock status | Status of the current all door lock | N/A | — |
| Alarm system status | Status of the current vehicle alarm | N/A | — |
| Device Authentication Seed the 1st word | This is the 8th byte from the 1st byte of the Seed value. | N/A | — |
| Device Authentication Seed the 2nd word | This is the 16th byte from the 9th byte of the Seed value. | N/A | — |
| Trip Counter | This counter is incremented in units of trips by the Freshness Value management master ECU. | N/A | — |
| Reset Counter | This counter is incremented periodically by the Freshness Value management master ECU. | N/A | — |
| 1st Left Door Open Status | Status of the current 1st-left door open/close of the vehicle platform | N/A | — |
| 1st Right Door Open Status | Status of the current 1st-right door open/close of the vehicle platform | N/A | — |
| 2nd Left Door Open Status | Status of the current 2nd-left door open/close of the vehicle platform | N/A | — |
| 2nd Right Door Open Status | Status of the current 2nd-right door open/close of the vehicle platform | N/A | — |
| Trunk Status | Status of the current trunk door open of the vehicle platform | N/A | — |
| Hood Open Status | Status of the current hood open/close of the vehicle platform | N/A | — |

4.5.2. API guides in Details for Security
4.5.2.1. Device Authentication Protocol Device authentication is applied when the VCIB is activated from "Sleep" mode.

After the authentication succeeds, the VCIB can start to communicate with ADK.

Figure 20:
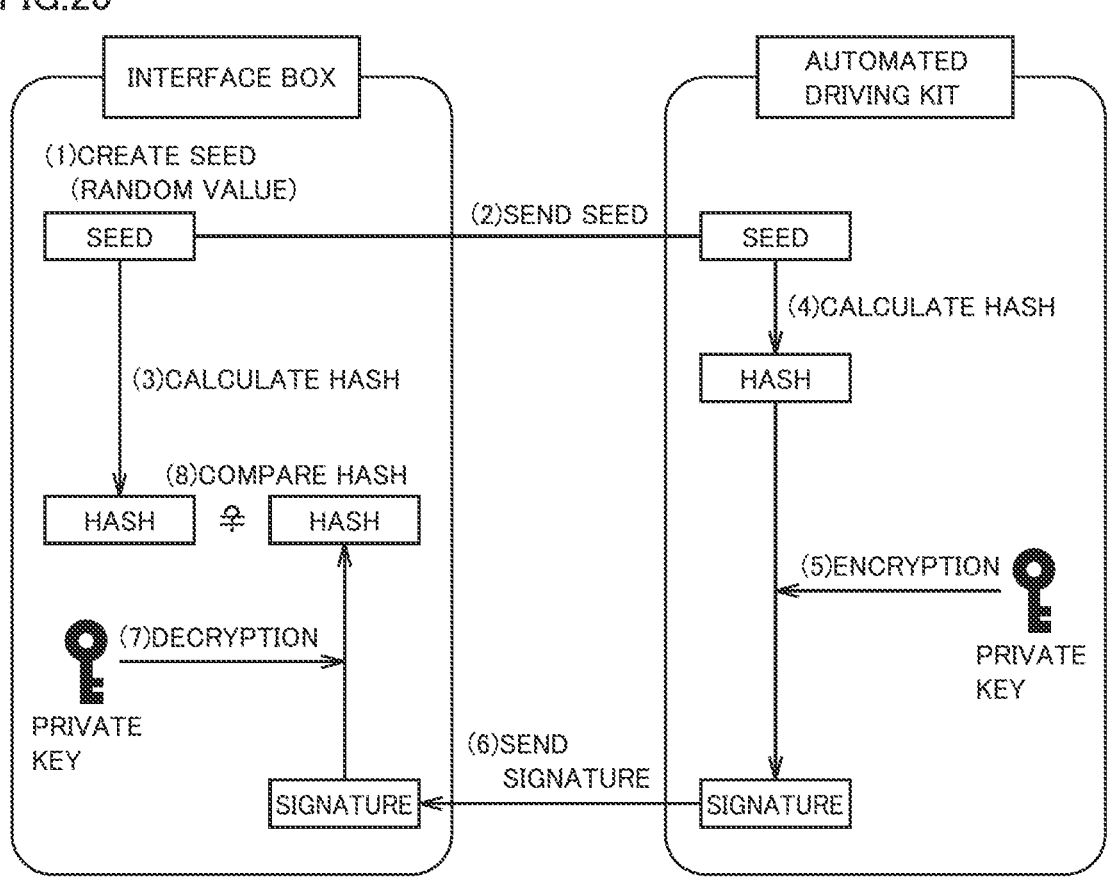
FIG. 20 is a diagram showing an authentication process.

Authentication process is as shown in FIG. 20 Authentication Process.

Authentication Specification

| Item | Specification | Note |
|---|---|---|
| Encryption algorithms | AES | FIPS 197 |
| Key length | 128 bit | — |
| Block cipher modes of operation | CBC | SP 800-38A |
| Hash algorithms | SHA-256 | FIPS 180-4 |
| Seed length | 128 bit | — |
| Signature length | 256 bit | — |

Though an embodiment of the present disclosure has been described above, it should be understood that the embodiment disclosed herein is illustrative and non-restrictive in every respect. The technical scope in the present disclosure is defined by the terms of the claims and is intended to include any modifications within the scope and meaning equivalent to the terms of the claims.

What is claimed is:

1. A vehicle comprising:
an autonomous driving system;
a base vehicle on which the autonomous driving system is mountable; and
a vehicle control interface box that interfaces between the base vehicle and the autonomous driving system, wherein
when a device of the base vehicle has stopped operation due to control interference caused by a user operation and an autonomous driving system operation that were simultaneously performed, the autonomous driving system transmits an operation command indicating a reset signal to the vehicle control interface box, and
wherein the vehicle control interface box resumes processing by generating a control command in accordance with an operation command received from the autonomous driving system only after the vehicle control interface box has received the operation command indication of the reset signal.

2. The vehicle according to claim 1, wherein
the autonomous driving system transmits an operation command indicating an opening operation or a closing operation to the vehicle control interface box after the autonomous driving system transmitted the operation command indicating the reset signal to the vehicle control interface box.

3. The vehicle according to claim 2, wherein
the vehicle control interface box
transmits the control command to the base vehicle.

4. The vehicle according to claim 1, wherein
the device is a second left door of the base vehicle,
the autonomous driving system transmits an operation command that requests an automatic opening and closing operation of the second left door to the vehicle control interface box, and when the second left door has stopped operation due to control interference caused by the user operation for the second left door and the autonomous driving system operation based on the operation command that were simultaneously performed, the autonomous driving system transmits the operation command indicating the reset signal to the vehicle control interface box.

5. The vehicle according to claim 4, wherein
when the second left door has stopped operation due to the control interference, the vehicle control interface box generates a control command in accordance with an operation command received from the autonomous driving system after the vehicle control interface box received the operation command indicating the reset signal, and
transmits the control command to the base vehicle.

6. The vehicle according to claim 1, wherein
the device is a second right door of the base vehicle,
the autonomous driving system transmits an operation command that requests an automatic opening and closing operation of the second right door to the vehicle control interface box, and
when the second right door has stopped operation due to control interference caused by the user operation for the second right door and the autonomous driving system operation based on the operation command that were simultaneously performed, the autonomous driving system transmits the operation command indicating the reset signal to the vehicle control interface box.

7. The vehicle according to claim 6, wherein
when the second right door has stopped operation due to the control interference, the vehicle control interface box generates a control command in accordance with an operation command received from the autonomous driving system after the vehicle control interface box received the operation command indicating the reset signal, and
transmits the control command to the base vehicle.

8. The vehicle according to claim 1, wherein
the device is all windows of the base vehicle,
the autonomous driving system transmits an operation command that requests an automatic opening and closing operation of the all windows to the vehicle control interface box, and
when the all windows have stopped operation due to control interference caused by the user operation for the all windows and the autonomous driving system operation based on the operation command that were simultaneously performed, the autonomous driving system transmits the operation command indicating the reset signal to the vehicle control interface box.

9. The vehicle according to claim 8, wherein
when the all windows have stopped operation due to the control interference, the vehicle control interface box generates a control command in accordance with an operation command received from the autonomous driving system after the vehicle control interface box received the operation command indicating the reset signal, and
transmits the control command to the base vehicle.

10. The vehicle according to claim 1, wherein
the device is a driver's seat window of the base vehicle,
the autonomous driving system transmits an operation command that requests an automatic opening and closing operation of the driver's seat window to the vehicle control interface box, and
when the driver's seat window has stopped operation due to control interference caused by the user operation for the driver's seat window and the autonomous driving system operation based on the operation command that were simultaneously performed, the autonomous driving system transmits the operation command indicating the reset signal to the vehicle control interface box.

11. The vehicle according to claim 10, wherein
when the driver's seat window has stopped operation due to the control interference, the vehicle control interface box generates a control command in accordance with an operation command received from the autonomous driving system after the vehicle control interface box received the operation command indicating the reset signal, and
transmits the control command to the base vehicle.

12. The vehicle according to claim 1, wherein
the device is other windows that are windows other than a driver's seat window of the base vehicle,
the autonomous driving system transmits an operation command that requests an automatic opening and closing operation of the other windows to the vehicle control interface box, and
when the other windows have stopped operation due to control interference caused by the user operation for the other windows and the autonomous driving system operation based on the operation command that were simultaneously performed, the autonomous driving system transmits the operation command indicating the reset signal to the vehicle control interface box.

13. The vehicle according to claim 12, wherein
when the other windows have stopped operation due to the control interference, the vehicle control interface box generates a control command in accordance with an operation command received from the autonomous driving system after the vehicle control interface box received the operation command indicating the reset signal, and
transmits the control command to the base vehicle.

* * * * *